(12) United States Patent
Yokoi et al.

(10) Patent No.: US 10,706,553 B2
(45) Date of Patent: Jul. 7, 2020

(54) IMAGE DETECTION DEVICE FOR DETECTING SHADOW OR LIGHT BASED ON DETECTED EDGES

(71) Applicant: TOSHIBA ELEVATOR KABUSHIKI KAISHA, Kawasaki-shi, Kanagawa (JP)

(72) Inventors: Kentaro Yokoi, Tokyo (JP); Shuhei Noda, Tokyo (JP); Satoshi Tamura, Hamura Tokyo (JP); Sayumi Kimura, Kawasaki Kanagawa (JP)

(73) Assignee: TOSHIBA ELEVATOR KABUSHIKI KAISHA, Kawasaki-Shi (JP)

( * ) Notice: Subject to any disclaimer, the term of this patent is extended or adjusted under 35 U.S.C. 154(b) by 71 days.

(21) Appl. No.: 16/042,264

(22) Filed: Jul. 23, 2018

(65) Prior Publication Data
US 2019/0172209 A1 Jun. 6, 2019

(30) Foreign Application Priority Data

Dec. 6, 2017 (JP) ................. 2017-234250

(51) Int. Cl.
*G06T 7/13* (2017.01)
*G06K 9/46* (2006.01)
*G06K 9/00* (2006.01)
*G06T 7/194* (2017.01)

(52) U.S. Cl.
CPC ............ *G06T 7/13* (2017.01); *G06K 9/00771* (2013.01); *G06K 9/4604* (2013.01); *G06T 7/194* (2017.01); *G06T 2207/30196* (2013.01)

(58) Field of Classification Search
CPC . G06T 7/13; G06T 7/194; G06T 2207/30196; G06K 9/00771; G06K 9/4604
See application file for complete search history.

(56) References Cited

U.S. PATENT DOCUMENTS

2012/0170803 A1* 7/2012 Millar ................ G06K 9/00771
382/103

FOREIGN PATENT DOCUMENTS

| CN | 101930540 A | 12/2010 |
|---|---|---|
| JP | 2001-243475 A | 9/2001 |
| JP | 3336102 B2 | 10/2002 |
| JP | 4467702 B2 | 5/2010 |

OTHER PUBLICATIONS

Database WPI Week 201117 Thomson Scientific, London, GB; AN 2011-B32651 XP-002788837.
Sanin et al., "Shadow Detection: A Survey and Comparative Evaluation of Recent Methods," Pattern Recognition, vol. 5, No. 4, 2012, pp. 1684-1695.

* cited by examiner

*Primary Examiner* — Christopher Wait
(74) *Attorney, Agent, or Firm* — Foley & Lardner LLP

(57) ABSTRACT

According to one embodiment, an image detection system includes an imaging apparatus, an edge extraction unit, a specific-edge extraction unit, a candidate area extraction unit, and a to-be-detected area determination unit. The edge extraction unit extracts edges each representing a boundary line between areas with different features. The specific-edge extraction unit extracts specific edges including at least remaining edges present in background image and input image. The candidate area extraction unit extracts candidate areas for a preset area to be detected. The to-be-detected area determination unit determines the area to be detected from candidate areas extracted.

7 Claims, 21 Drawing Sheets

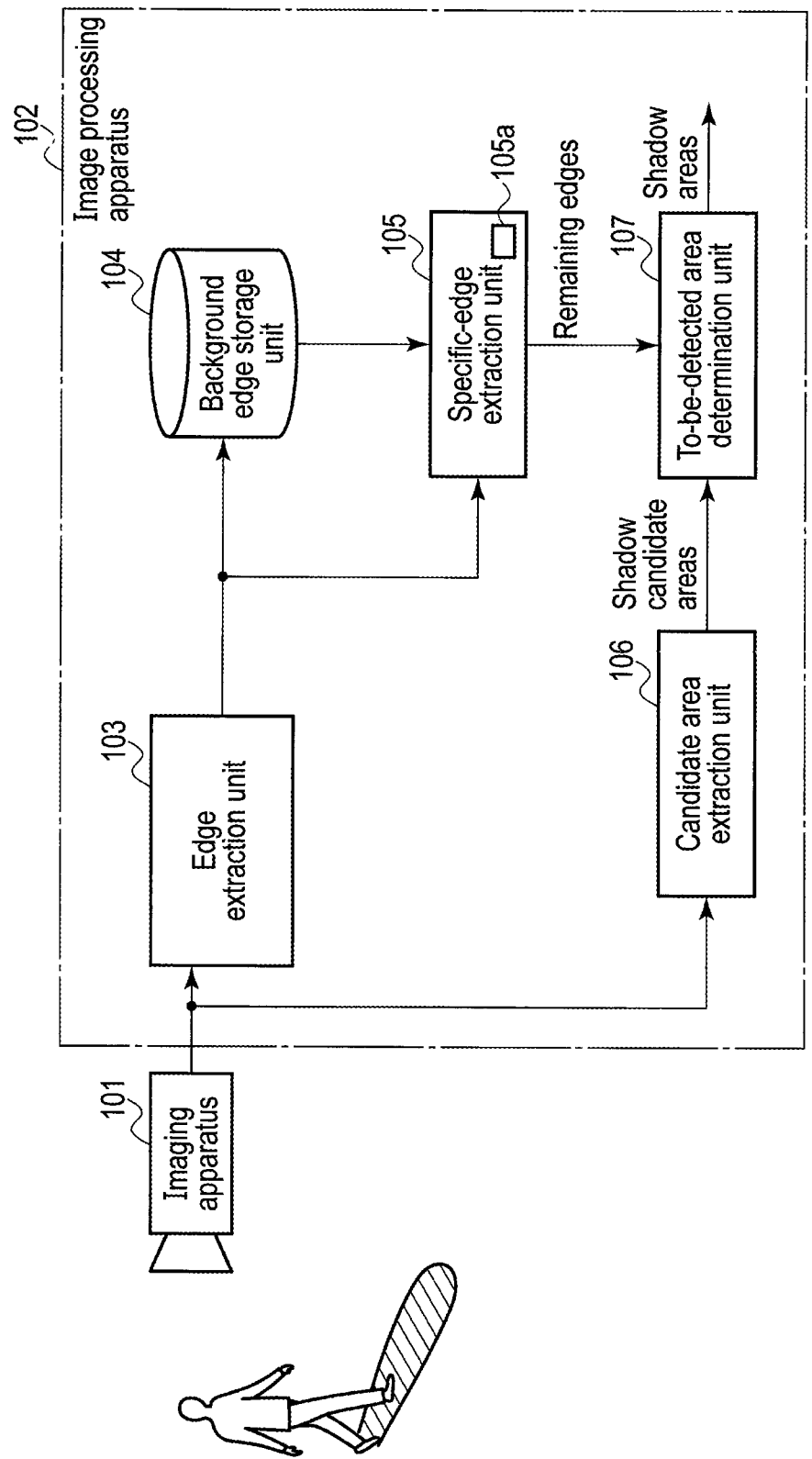
F I G. 1

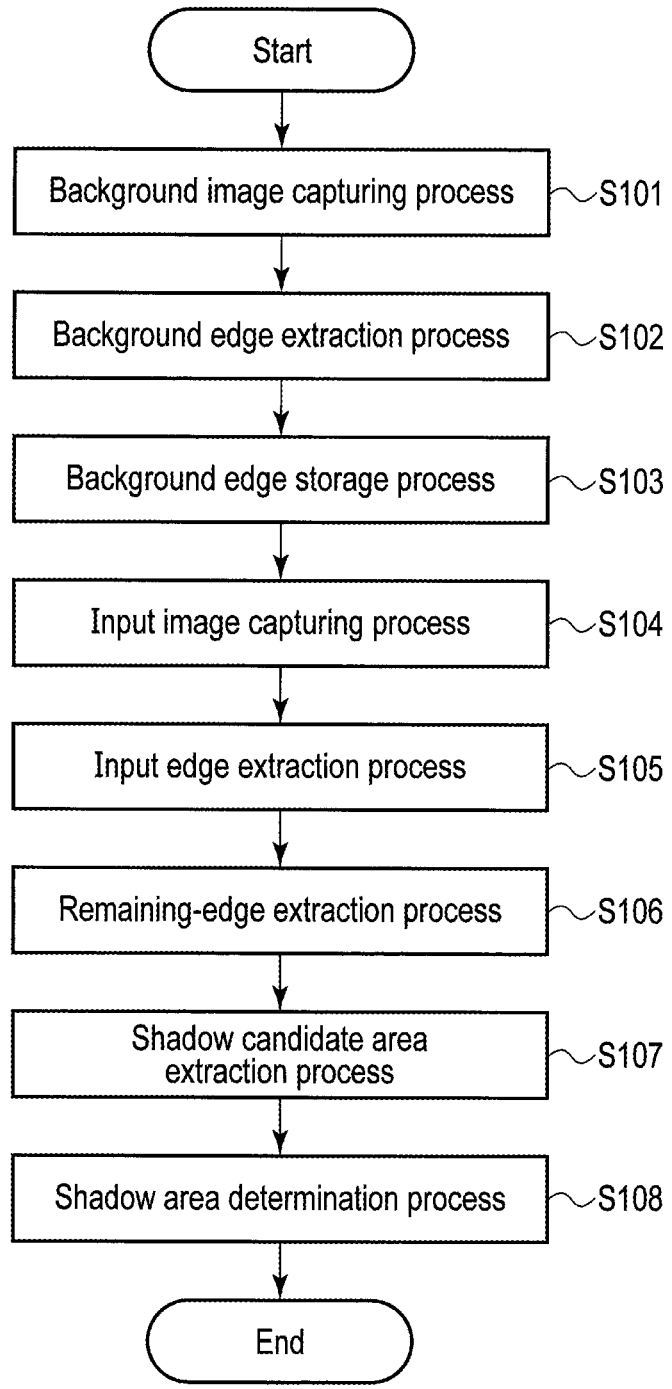
F I G. 2

| Input image / Background image | Areas with edge(s) | Areas with no edge |
|---|---|---|
| Areas with edge(s) | (a) Remaining edges (inside of shadow: e1/background: e2) | (b) Disappearing edges (inside of area overwritten with foreground: e3) |
| Areas with no edge | (c) Added edges (edge of foreground: e4/contour of foreground: e5/contour of shadow: e6) | (d) No edge (inside of any of foreground/background/shadow: e7, e8, e9) |

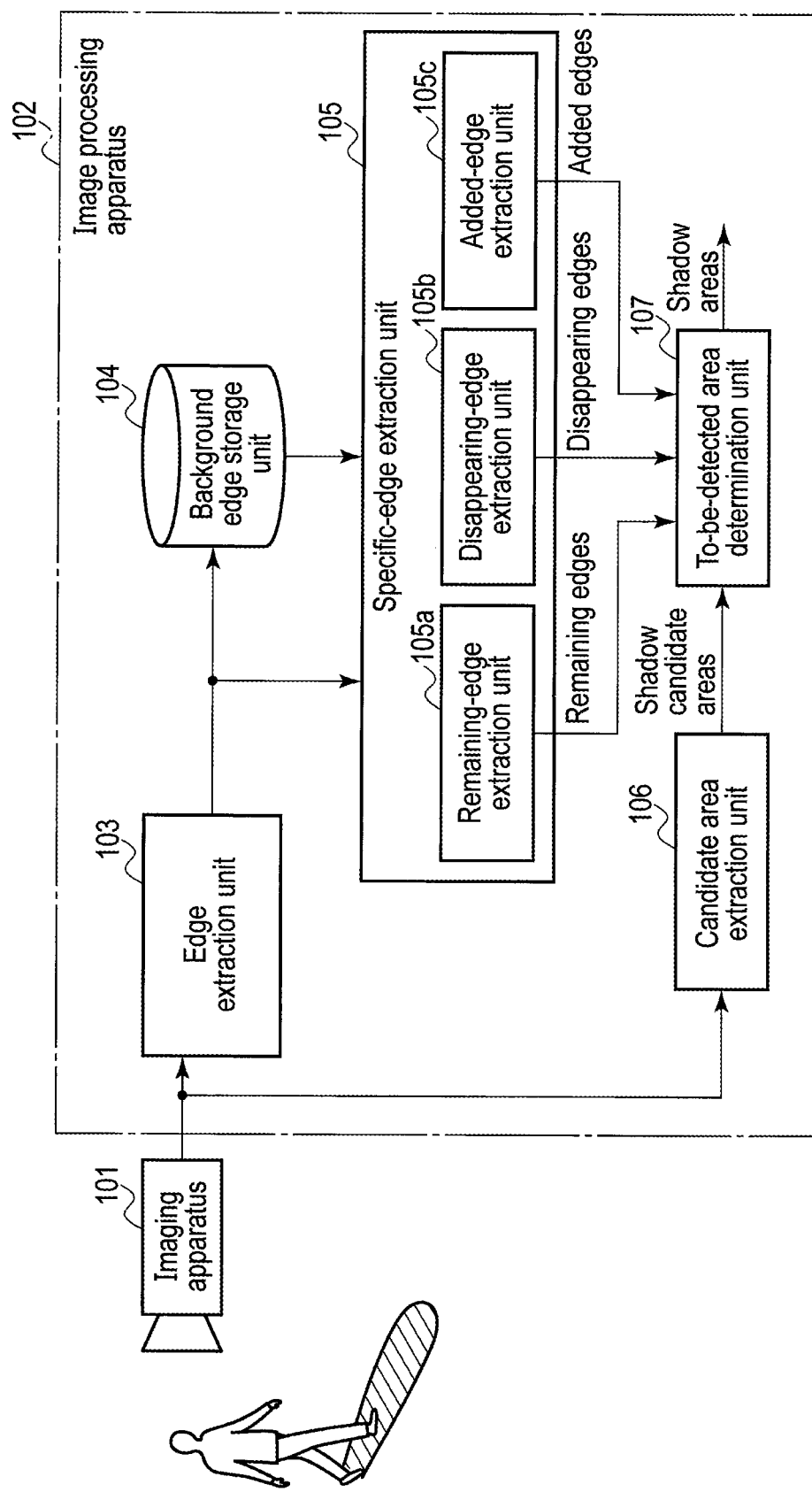
F I G. 6

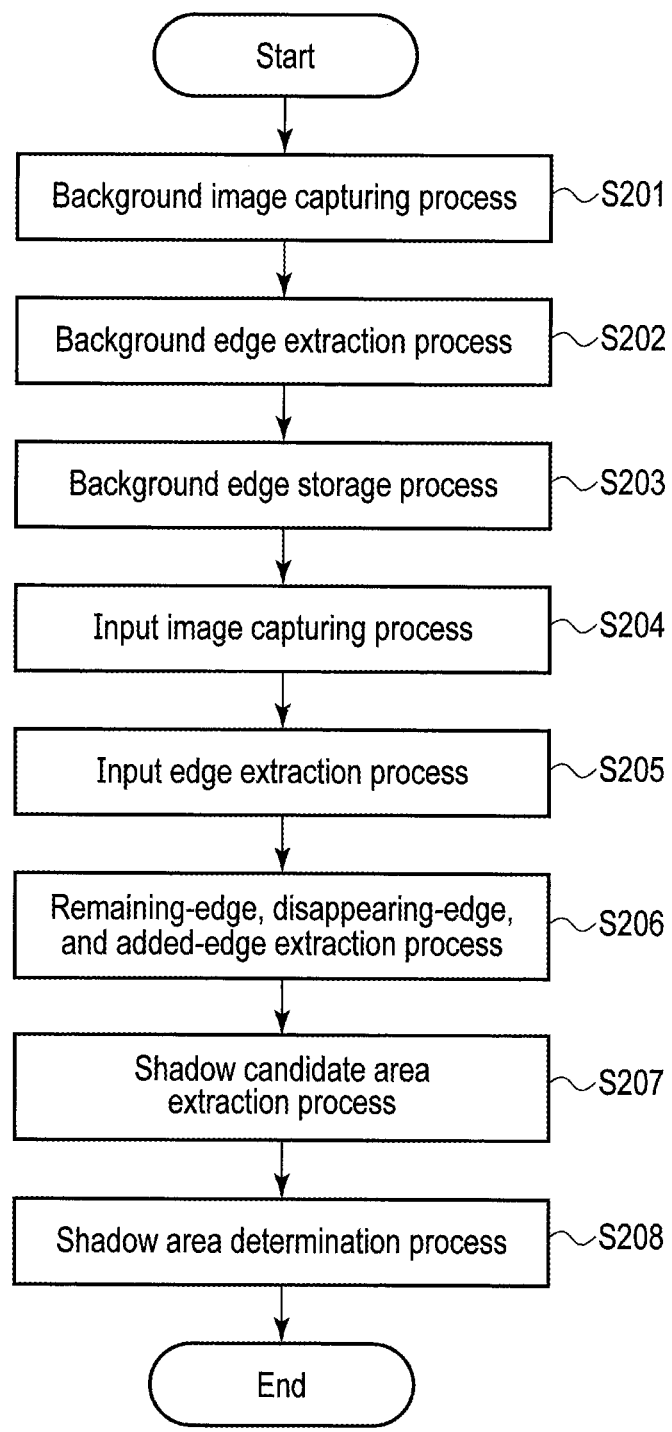
F I G. 7

| Remaining edges | Small amount of edge | Large amount of edge |
| --- | --- | --- |
| Disappearing edges | Large amount of edge | Small amount of edge |
| Added edges | Large amount of edge | Small amount of edge |

| Determination result | Foreground (not shadow) | Shadow |
| --- | --- | --- |

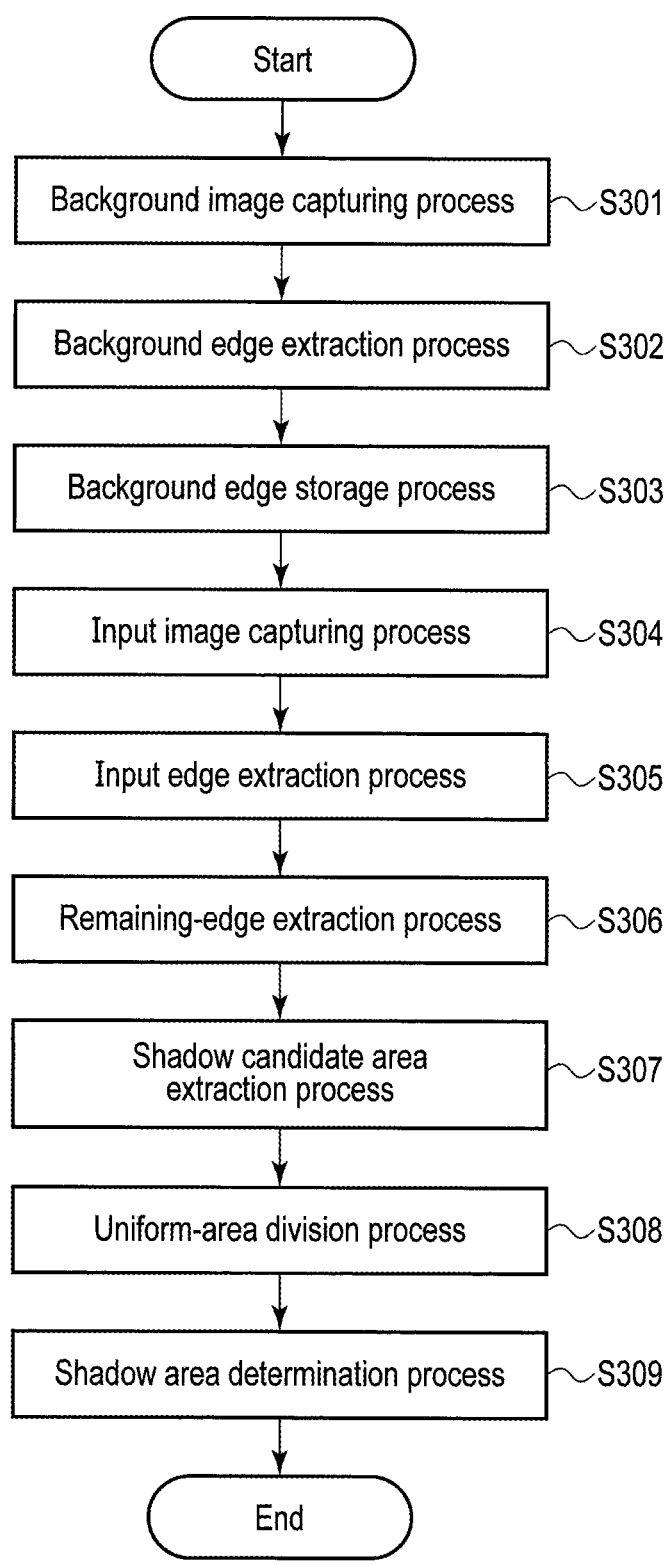
F I G. 11

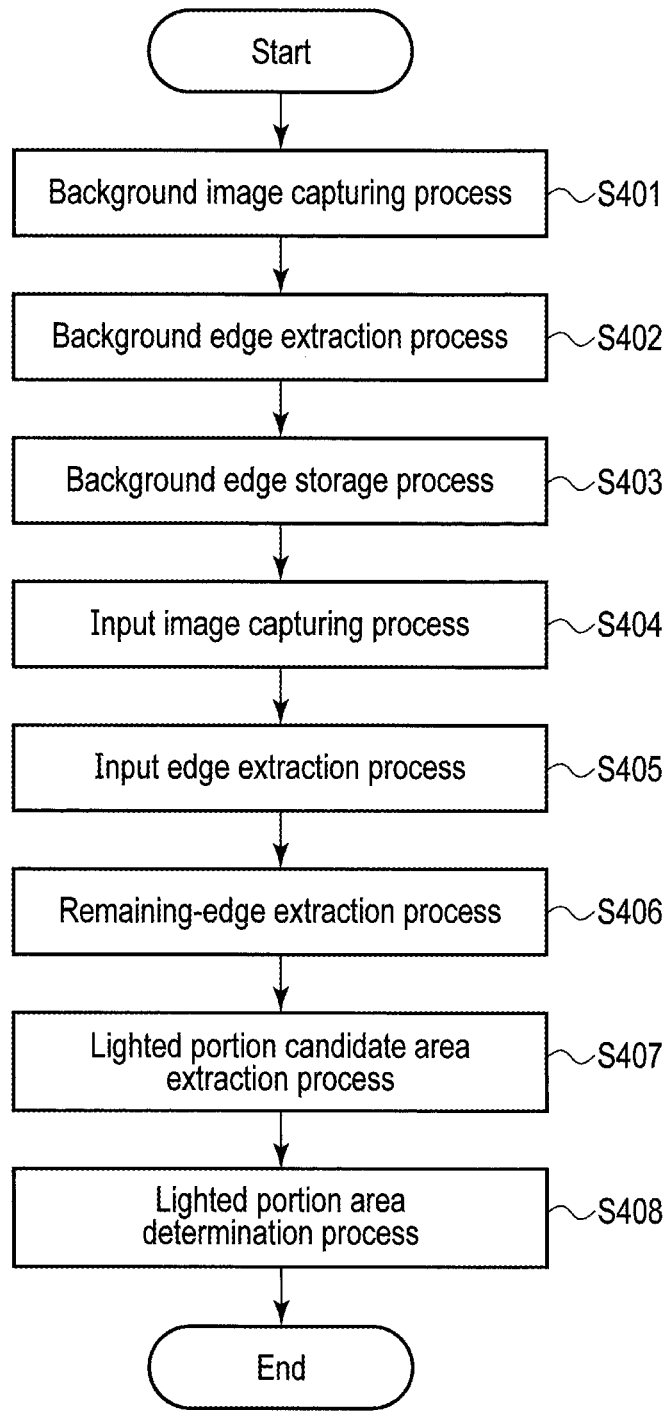
F I G. 13

| Input image / Background image | Areas with edge(s) | Areas with no edge |
|---|---|---|
| Areas with edge(s) | (a) Remaining edges (inside of lighted portion: e11/background: e12) | (b) Disappearing edges (inside of area overwritten with foreground: e13) |
| Areas with no edge | (c) Added edges (edge of foreground: e14/contour of foreground: e15/contour of lighted portion: e16) | (d) No edge (inside of any of foreground/background/lighted portion: e17, e18, e19) |

F I G. 15

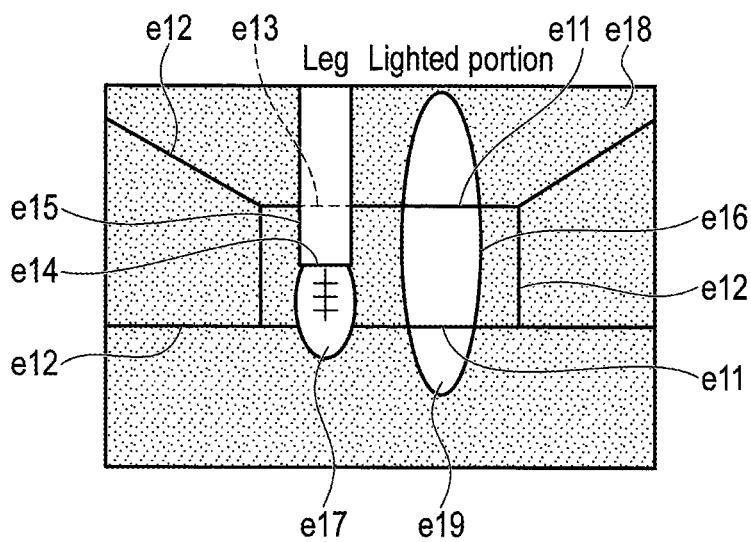

F I G. 16

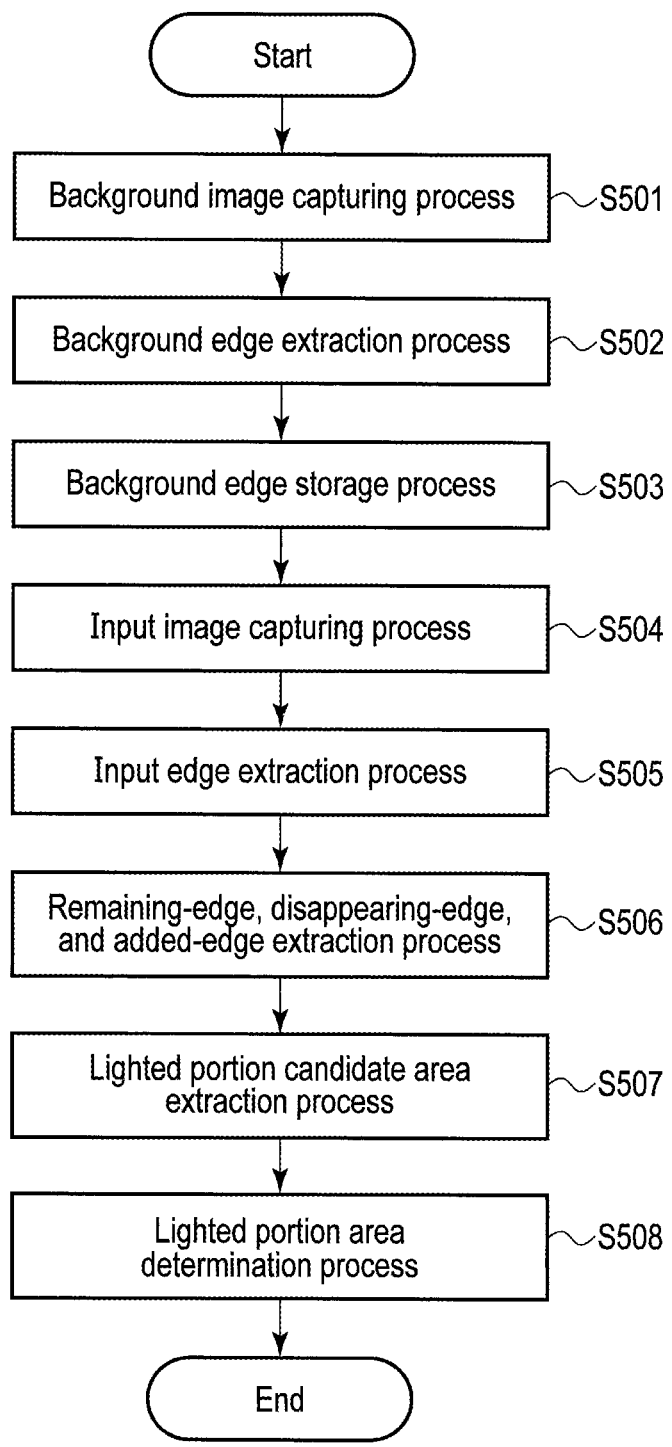
F I G. 17

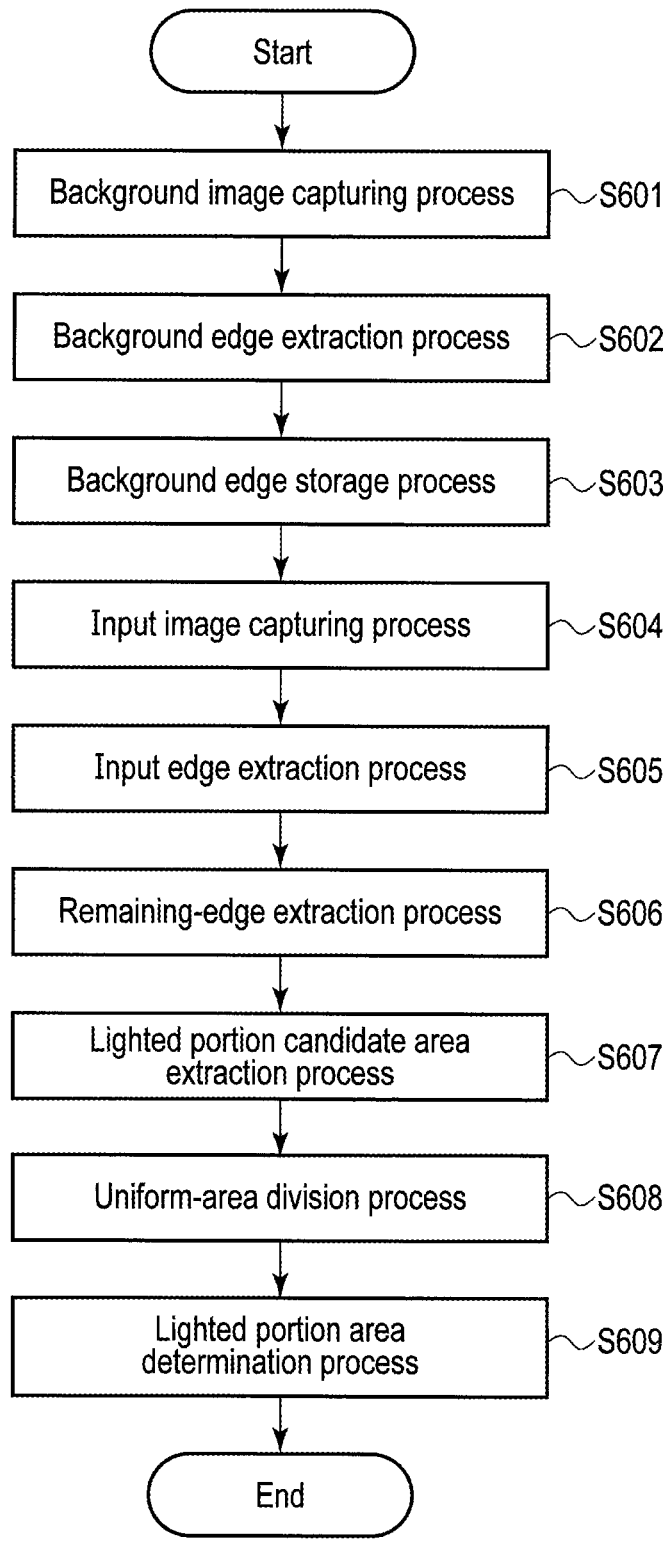
F I G. 20

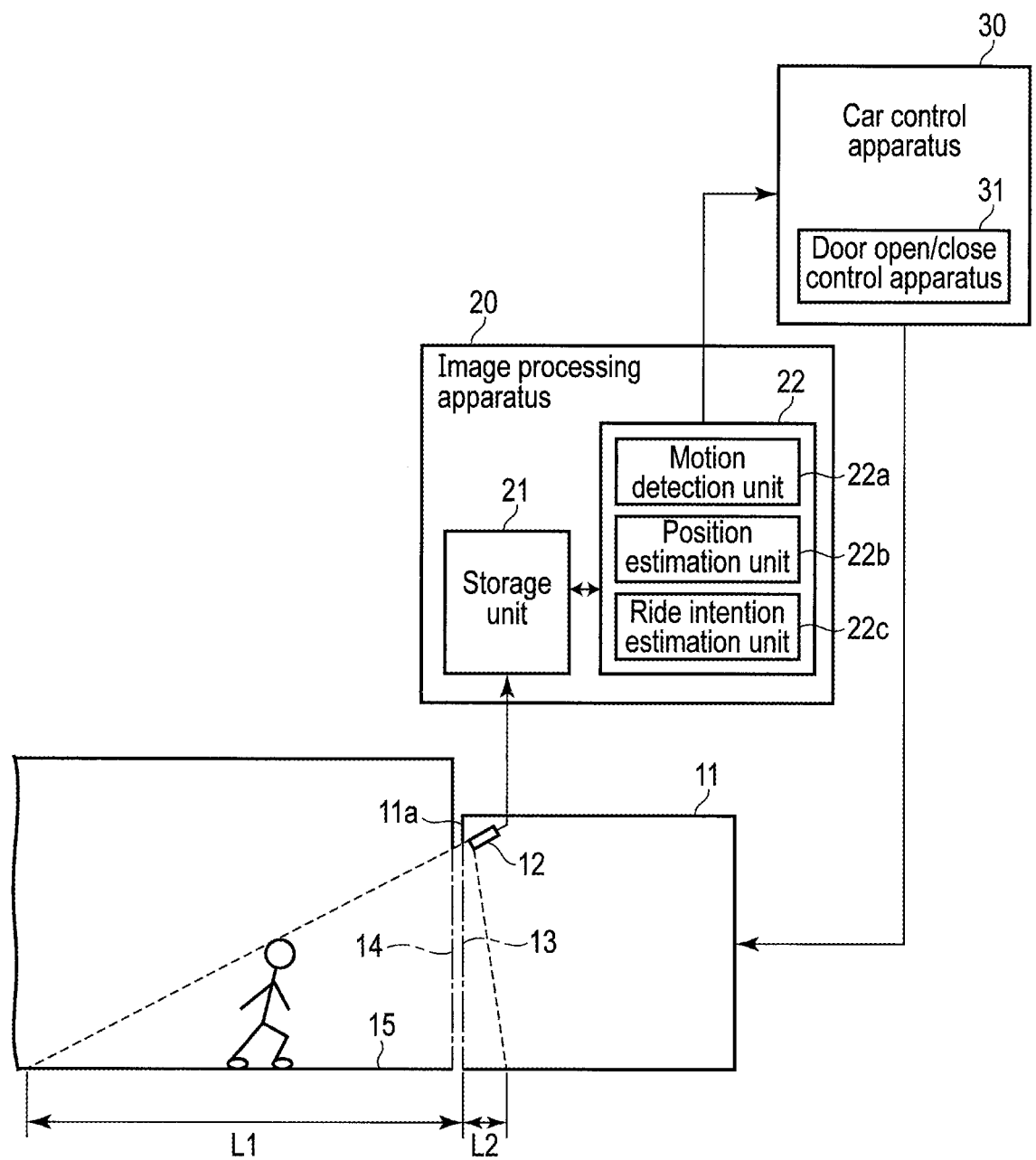
F I G. 22

IMAGE DETECTION DEVICE FOR DETECTING SHADOW OR LIGHT BASED ON DETECTED EDGES

CROSS-REFERENCE TO RELATED APPLICATIONS

This application is based upon and claims the benefit of priority from Japanese Patent Application No. 2017-234250, filed Dec. 6, 2017, the entire contents of which are incorporated herein by reference.

FIELD

Embodiments described herein relate generally to an image detection system used, for example, for door control of an elevator.

BACKGROUND

In a system utilizing a camera to detect a person for door control, a shadow in a captured image needs to be removed. One shadow determination method involves applying a texture such as a lattice pattern to a background of an image capturing target and determining that a dark area in an input image where the background texture remains is a shadow. Another shadow determination method involves determining a shadow based on a brightness ratio of the background image and the input image.

However, the method using the background texture (background pattern) is not applicable if the pattern of the background is precluded from being freely set. The method is also not applicable if a low resolution of the camera prevents the background texture (background pattern) from being captured. In the method for comparing the brightness of the background image to the brightness of the input image is a dark area determines is as a shadow, and therefore a person in a dark cloth may be erroneously determined as a shadow.

BRIEF DESCRIPTION OF THE DRAWINGS

FIG. 1 is a block diagram illustrating a configuration of an image detection system according to a first embodiment.

FIG. 2 is a flowchart illustrating a shadow area detection process executed by the image processing apparatus according to the first embodiment.

FIG. 6 is a block diagram illustrating a configuration of an image detection system according to a second embodiment.

FIG. 7 is a flowchart illustrating a shadow area detection process executed by an image processing apparatus according to the second embodiment.

FIG. 11 is a flowchart illustrating a shadow area detection process executed by an image processing apparatus according to the third embodiment.

FIG. 13 is a flowchart illustrating a lighted portion area detection process executed by an image processing apparatus according to a fourth embodiment.

FIG. 15 is a diagram illustrating a relationship between a background/input image and edge areas according to the fourth embodiment.

FIG. 16 is a diagram depicting a specific example presented to illustrate various edges according to the fourth embodiment.

FIG. 17 is a flowchart illustrating a lighted portion area detection process executed by the image processing apparatus according to a fifth embodiment.

FIG. 20 is a flowchart illustrating a lighted portion area detection process executed by an image processing apparatus according to a sixth embodiment.

FIG. 22 is a diagram illustrating a configuration of a ride detection system for an elevator as an application example.

DETAILED DESCRIPTION

Figure 3:
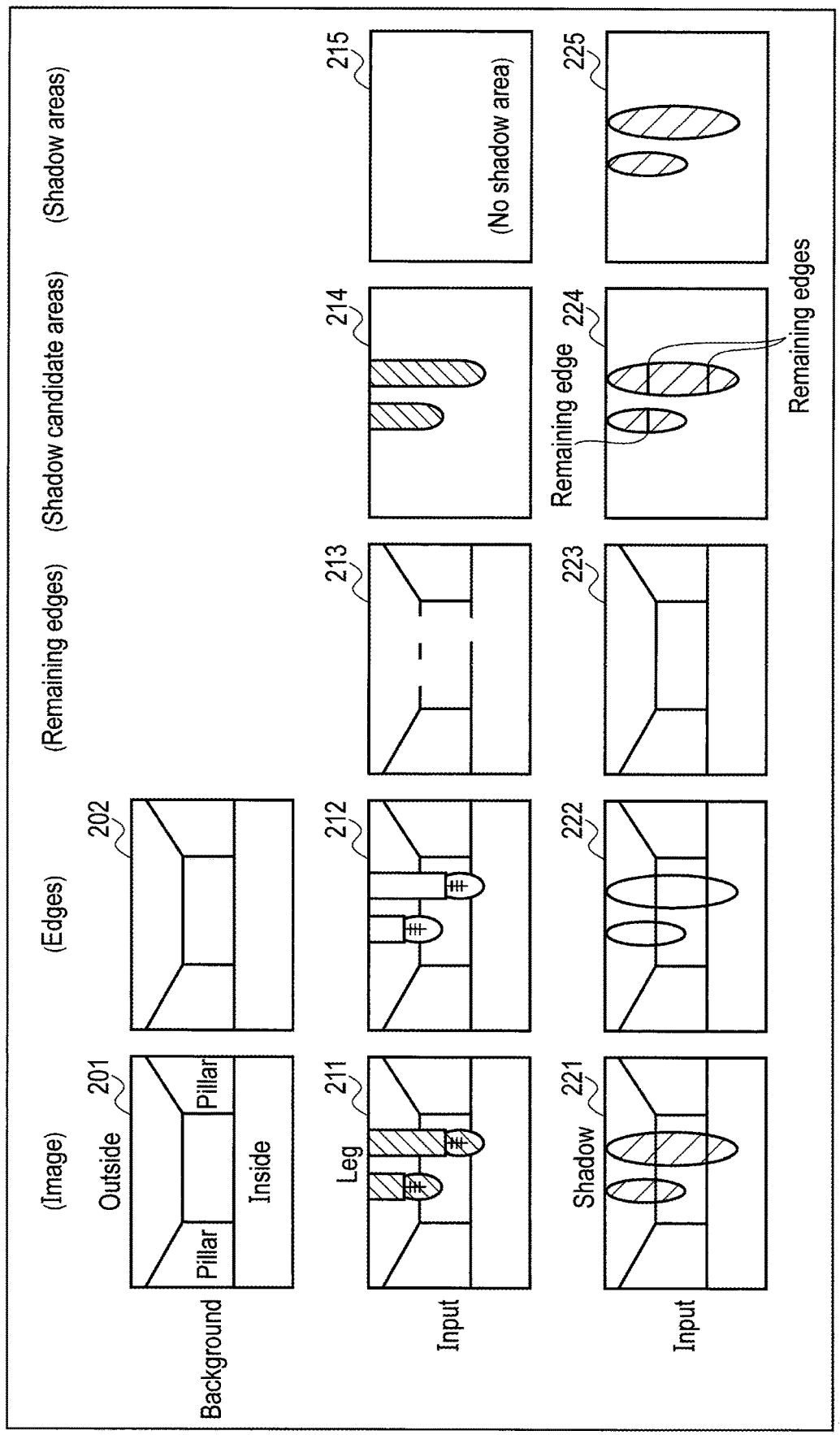
FIG. 3 is a conceptual drawing of a background image and an input image, illustrating the shadow area detection process.

Various embodiments will be described hereinafter with reference to the accompanying drawings.

In general, according to one embodiment, an image detection system includes an imaging apparatus, an edge extraction unit, a specific-edge extraction unit, a candidate area extraction unit, and a to-be-detected area determination unit. The imaging apparatus is installed at an optional position. The edge extraction unit extracts edges each representing a boundary line between areas with different features, from an image acquired by the imaging apparatus. The specific-edge extraction unit compares edges preliminarily extracted from a background image with edges extracted from an input image to extract specific edges including at least remaining edges present in both images. The candidate area extraction unit extracts candidate areas for a preset area to be detected, from the input image. The to-be-detected area determination unit determines the area to be detected from candidate areas extracted by the candidate area extraction unit, based on the specific edges extracted by the specific-edge extraction unit.

An image detection system according to the present invention is used, for example, for open/close control of a door of an elevator or automatic doors in a building. The image detection system includes a function to detect a shadow or light in an image captured by a camera. A case where a shadow is to be detected and a case where light is to be detected will be separately described below.

First Embodiment

FIG. 1 is a block diagram illustrating a configuration of an image detection system according to a first embodiment.

The image detection system according to the present embodiment includes an imaging apparatus 101 and an image processing apparatus 102. The imaging apparatus 101 is a small monitoring camera, for example, an in-vehicle camera. The imaging apparatus 101 includes a wide lens and is capable of consecutively capturing a number of frames in one second (for example, 30 frames/second). For example, in a case of an elevator, the imaging apparatus 101 is installed near a top portion of a door of a car to capture an image of a user in the car within a prescribed image capturing range. The installation position of the imaging apparatus 101 is not limited to the elevator car, and the imaging apparatus 101 may be installed at any place where the system can be utilized.

In the first embodiment, a shadow in a captured image is to be detected. The image processing apparatus 102 includes, as functions to detect a shadow, an edge extraction unit 103, a background edge storage unit 104, a specific-edge extraction unit 105, a candidate area extraction unit 106, and a to-be-detected area determination unit 107.

The edge extraction unit 103 extracts edges from images sequentially captured by the imaging apparatus 101. The "edge" means not only a straight line or a curve in an image but also a boundary line between areas different from each other in feature such as color, brightness, or pattern. Edge extraction may be performed using a known technique. For example, a Sobel edge filter or a Canny edge filter may be used. Alternatively, the boundary position between the areas may be determined based on a difference in variance of brightness values of pixels.

The background edge storage unit 104 stores information (coordinate positions on an image and the like) on edges extracted from a background image by the edge extraction unit 103. The "background image" is an image captured in an environment where no person or object is present, and is used as a reference image for comparison with an input image described below. The "input image" is an image captured during detection and may contain a person or an object, and further contain a shadow or light.

The specific-edge extraction unit 105 compares the edges extracted from the background image with edges extracted from the input image to extract specific edges corresponding to a condition for an area to be detected. In the first embodiment, the "area to be detected" refers to an area where a shadow of a person or an object is present. The "specific edges" include remaining edges present at least both in the background image and in the input image. The specific-edge extraction unit 105 includes a remaining-edge extraction unit 105a, and it compares the edges in the background image with the edges in the input image and extracts, the remaining edges present in both images as the specific edges.

The candidate area extraction unit 106 extracts candidates for a shadow area preset as an area to be detected (hereinafter referred to as shadow candidate areas), from the input image. The shadow candidate area may be extracted using, for example, a well-known background difference method or a technique described in:

"Shadow Detection: A Survey and Comparative Evaluation of Recent Methods" (A. Sanin et al., Pattern Recognition, 2012)

The to-be-detected area determination unit 107 determines a shadow area from the shadow candidate areas extracted by the candidate area extraction unit 106, based on the remaining edges extracted by the specific-edge extraction unit 105.

Now, operations of the first embodiment will be described.

FIG. 2 is a flowchart illustrating a shadow area detection process executed by the image processing apparatus 102. FIG. 3 is a conceptual drawing of a background image and an input image, illustrating the shadow area detection process. In an example in FIG. 3, an environment is assumed where the inside of a room is separated from the outside of the room across a pair of pillars. For example, in a case of an elevator car, the pillars correspond to door frames, the inside corresponds to the inside of a car, and the outside corresponds to a hall (see FIG. 23). The imaging apparatus 101 is installed at a top portion of a doorway of the room to capture an image of a prescribed range from the inside toward the outside of the room.

In the first embodiment, a shadow area is an area to be detected. For initial settings, background edges are preliminarily acquired from an image of an environment where no person or object is present. Specifically, first, the imaging apparatus 101 acquires a background image and loads it into the image processing apparatus 102 (step S101). The edge extraction unit 103 of the image processing apparatus 102 uses, for example, a Sobel edge filter or a Canny edge filter to extract edges each representing a boundary line between areas with different features, from the background image (step S102). The edge extraction unit 103 stores information on the edges in the background edge storage unit 104 (step S103).

A background image 201 illustrated in FIG. 3 contains no person or object, and edges 202 extracted from the background image 201 contain no person or object. Here, only large frames are drawn for convenience, but in actuality, more complicated lines, curves, and the like are extracted as the edges 202.

Then, during detection, the imaging apparatus 101 acquires an input image and loads it into the image processing apparatus 102 (step S104). The input image is a captured image of an environment where a person, an object, or the like is present. The edge extraction unit 103 of the image processing apparatus 102 extracts edges each representing a boundary line between areas with different features, from the input image, as is the case with the above-described background image (step S105).

In actuality, input images each including a number of frames in one second (for example, 30 frames/second) are sequentially loaded into the image processing apparatus 102, which executes a shadow area detection process on the input images. In the example in FIG. 3, a first input image 211 represents the presence of legs of a person in the room, and edges 212 including the person's legs are extracted. On the other hand, a second input image 221 contains a shadow of a person or an object, and edges 222 including the shadow are extracted.

When the edges are extracted from the input image, the specific-edge extraction unit 105 compares the edges in the background image stored in the background edge storage unit 104 with the edges in the input image. The specific-edge extraction unit 105 extracts remaining edges present in both images as specific edges needed to determine a shadow area (step S106).

In the first input image 211 illustrated in FIG. 3, the background is hidden by the person's legs, resulting in partly discontinued remaining edges 213. Furthermore, typically, portions of the background present under shadows do not disappear, and thus, for the second input image 221, resultant remaining edges 223 include the background and the shadows.

On the other hand, the candidate area extraction unit 106 extracts shadow candidate areas from the input images using a well-known method, for example, a background difference method (step S107). In the example in FIG. 3, the person's legs are extracted from the first input image 211 as shadow candidate areas 214, and shadow-appearing portions are extracted from the second input image 221 as shadow candidate areas 224.

The to-be-detected area determination unit 107 determines shadow areas from the shadow candidate areas extracted by the candidate area extraction unit 106, based on the remaining edges extracted by the specific-edge extraction unit 105 (step S108). In this case, shadow candidate areas containing sufficient remaining edges are determined to be shadow areas. In the example in FIG. 3, the shadow candidate areas 214 acquired from the first input image 211 contain no remaining edges, whereas the shadow candidate areas 224 acquired from the second input image 221 contain remaining edges. Therefore, the shadow candidate areas 224 acquired from the second input image 221 are extracted as shadow areas 225.

Figures 4, 5:
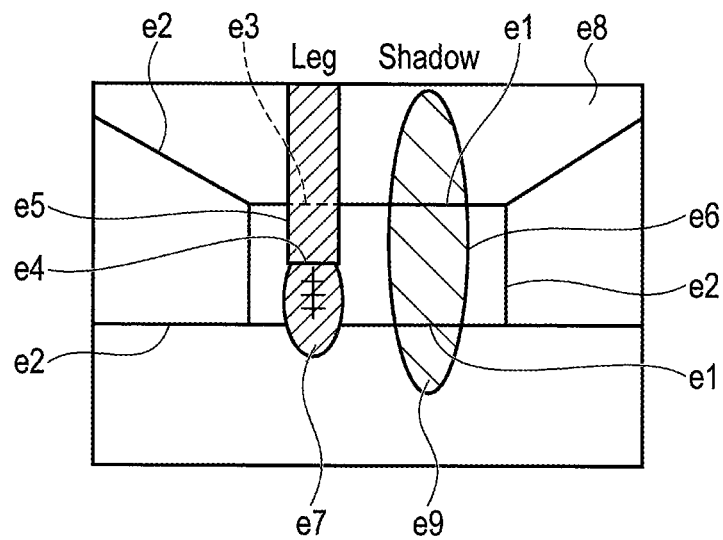
FIG. 4 is a diagram illustrating a relationship between a background/input image and edge areas according to the first embodiment.
FIG. 5 is a diagram depicting a specific example presented to illustrate various edges according to the first embodiment.

With reference to FIG. 4 and FIG. 5, a shadow area determination process will be described in detail.

FIG. 4 is a diagram illustrating a relationship between a background/input image and edge areas. For a background image, the areas are classified into areas with an edge(s) and areas with no edge on a vertical axis. For an input image, the areas are classified into areas with an edge(s) and areas with no edge on a horizontal axis. FIG. 5 depicts a specific example presented to illustrate various edges. FIG. 5 illustrates that a mixture of a leg and a shadow is present in a room corresponding to the background.

In FIG. 4, section (a) indicates edges present both in the background image and in the input image (remaining edges). In the example in FIG. 5, the following correspond to the remaining edges: portions (e1) of the background which are visible under the shadow and portions (e2) of the background which are not hidden by a foreground. The "foreground" as used herein refers to the input image written on the background image.

Section (b) indicates portions of the background image which are present as edges in the background image but which are overwritten with the foreground (disappearing edges). In the example in FIG. 5, the disappearing edge corresponds to a portion (e3) of the background which is hidden by the foreground.

Section (c) indicates areas where no edge is present in the background image but where edges appear in the input image (added edges). In the example in FIG. 5, the following correspond to the added edges: an edge (e4) different from a contour of the foreground, the contour of the foreground (e5), and the contour of the shadow (e6).

Section (d) indicates areas containing no edge in the background image or in the input image. In the example in FIG. 5, the following correspond to the areas with no edge: the inside of the foreground (e7), the inside of the background (e8), and the inside of the shadow (e9).

Here, areas darker than the room, which corresponds to the background, are extracted as shadow candidate areas. Those of the shadow candidate areas which do not contain sufficient remaining edges may be determined to be not shadows. Those of the shadow candidate areas which contain sufficient remaining edges may be determined to be shadows.

The sufficiency of the remaining edge is determined using, for example, a preset threshold TH. That is, if the number of pixels E of the remaining edges is "E≥TH", an area is determined to contain a sufficiently large number of remaining edges.

Otherwise, the area is determined to contain a sufficiently small number of remaining edges.

Determination of the Threshold TH

For example, as indicated by the following equation, TH is defined as a value obtained by multiplying the area S of a shadow candidate area by a coefficient W set according to an image size, the environment, or the like.

$$TH = S*W$$

As to the above-described determination method, it has been confirmed through a plurality of experiments using real images that shadow areas contain a large number of remaining edges.

Thus, according to the first embodiment, remaining edges present both in the background image and in the input image are extracted to enable detection of shadow areas contained in an image. Therefore, for example, any system detecting a person utilizing a captured image is enabled to exclude a possible shadow in the captured image to correctly detect only a person.

Furthermore, the background needs no texture (a pattern such as a lattice pattern), and thus, the first embodiment is capable of dealing with a case where the pattern of the background is not freely settable and a case where the background texture cannot be captured due to low resolution of the camera.

To extract more edges stably from the captured image, for example, boundary lines between a floor and pillars may be painted or marked for emphasis or different floor materials may be used to emphasize the boundary lines. The painting or marking for emphasizing the boundary lines can be relatively easily achieved and is thus cost-effective.

Second Embodiment

Now, a second embodiment will be described.

In the first embodiment, shadow areas are determined by focusing on remaining edges present both in the background image and in the input image. In the second embodiment, shadow areas are determined by taking into account disappearing edges and added edges in addition to the remaining edges.

FIG. 6 is a block diagram illustrating a configuration of an image detection system according to the second embodiment. The same components as those in FIG. 1 in the first embodiment are denoted by the same reference numerals and will not be described below.

In the second embodiment, shadows present in the captured image are to be detected as is the case with the first embodiment. The specific-edge extraction unit 105 is provided with a disappearing-edge extraction unit 105*b* and an added-edge extraction unit 105*c* in addition to the remaining-edge extraction unit 105*a*.

The disappearing-edge extraction unit 105*b* extracts disappearing edges which are present in the background image but which are absent in the input image. The added-edge extraction unit 105*c* extracts disappearing edges which are absent in the background image but which are present in the input image.

The specific-edge extraction unit 105 compares edges extracted from the background image with edges extracted from the input image to extract the above-described three types of edges (remaining edges, disappearing edges, and added edges) as specific edges needed to determine shadow areas.

The to-be-detected area determination unit 107 determines shadow areas from the candidate areas extracted by the candidate area extraction unit 106, based on the above-described three types of edges extracted by the specific-edge extraction unit 105.

Now, operations of the second embodiment will be described.

FIG. 7 is a flowchart illustrating a shadow area detection process executed by the image processing apparatus 102 according to the second embodiment. Processing in steps S201 to S205 is similar to the processing in steps S101 to S105 in FIG. 2 and will thus not be described below.

When edges are extracted from the input image, the specific-edge extraction unit 105 compares the edges in the background image stored in the background edge storage unit 104 with the edges in the input image. Based on the result of the comparison, the specific-edge extraction unit 105 extracts remaining edges, disappearing edges, and added edges from the input image as specific edges needed to determine shadow areas (step S206).

The remaining edges are edges present both in the background image and in the input image (see section (a) in FIG. 4 and e1 and e2 in FIG. 5). The disappearing edges are edges which are present in the background image but which are overwritten with the foreground in the input image and disappear (see section (b) in FIG. 4 and e3 in FIG. 5). The added edges are edges which are absent in the background image but which appear in the input image (see section (c) in FIG. 4 and e4, e5, and e6 in FIG. 5).

On the other hand, the candidate area extraction unit 106 extracts candidates for shadow areas (shadow candidate areas) from the input image using a well-known method, for example, the background difference method (step S207). The to-be-detected area determination unit 107 determines shadow areas from the shadow candidate areas extracted by the candidate area extraction unit 106 based on the above-described three types of edges extracted by the specific-edge extraction unit 105 (step S208). In this case, the determination method varies according to the type of the edge.

Figure 8:
FIG. 8 is a diagram illustrating determination conditions for various edges according to the second embodiment.

That is, as illustrated in FIG. 8, for remaining edges, those of the shadow candidate areas which contain sufficient remaining edges are determined to be shadow areas. For disappearing edges, those of the shadow candidate areas which do not contain sufficient disappearing edges are determined to be shadow areas. For added edges, those of the shadow candidate areas which do not contain sufficient added edges are determined to be shadow areas.

In contrast, the following areas correspond to the foreground: those of the shadow candidate areas which do not contain sufficient remaining edges, those of the shadow candidate areas which contain sufficient disappearing edges, and those of the shadow candidate areas which contain sufficient added edges. These areas are thus determined to be not shadow areas.

The sufficiency of the edge is determined using, for example, thresholds TH1, TH2, and TH3 preset for the respective types of edges. That is, if the number of pixels E1 of the remaining edges is "E1≥TH1", an area is determined to contain a sufficiently large number of remaining edges. Otherwise, the area is determined to contain a sufficiently small number of remaining edges.

The area is determined to contain a sufficiently large number of disappearing edges if the number of pixels E2 of the disappearing edges is "E2≥TH2". Otherwise, the area is determined to contain a sufficiently small number of disappearing edges.

The area is determined to contain a sufficiently large number of added edges if the number of pixels E3 of the added edges is "E3≥TH3". Otherwise, the area is determined to contain a sufficiently small number of added edges.

Determination of the Thresholds TH1, TH2, and TH3

For example, as indicated by the following equations, the values TH1, TH2, and TH3 are obtained by multiplying the area S of a shadow candidate area by coefficients W1, W2, and W3, respectively, which are set according to the image size, the environment, or the like.

$TH1 = S*W1$ $TH2 = S*W2$ $TH3 = S*W3$

Depending on the image capturing environment, not all of the above-described three types of edges are extracted. Thus, at least one of the three types of edges may be used to determine shadow areas. In this case, one or two types of edges of significantly large or small number than that of the other type(s) of edge may exclusively be used.

In a Case where One of the Three Types of Edges is Used

For example, if only the disappearing edges are used, the sufficiency of the disappearing edge is determined as follows.

If the number of pixels E2 in the disappearing edges is "E2≥TH2", an area may be determined to contain a sufficiently large number of disappearing edges. Otherwise the area may be determined to contain a sufficiently small number of disappearing edges. In the determination process in step S208 described above, the area may be determined to be a shadow if the area contains a small number of disappearing edges, and to be the foreground (not a shadow) if the area contains a large number of disappearing edges.

In a Case where Two of the Three Types of Edges are Used

For example, if the remaining edges and the disappearing edges are used, the sufficiency of these edges is determined as follows.

If the number of pixels E1 in the remaining edges is "E1≥TH1", an area is determined to contain a sufficiently large number of remaining edges. If the number of pixels E2 in the disappearing edges is "E2≥TH2", the area is determined to contain a sufficiently large number of disappearing edges. Otherwise the area is determined to contain a sufficiently small number of remaining edges and a sufficiently small number of disappearing edges.

In the determination process in step S208 described above, the area may be determined to be a shadow if the area contains a large number of remaining edges and a small number of disappearing edges, and to be the foreground if the area contains a small number of remaining edges and a large number of disappearing edges. Otherwise the area may be determined to be the foreground (not a shadow).

In combinations in FIG. 8, the area is determined to be a shadow in a case of "a large number of remaining edges and a small number of disappearing edges" and to be the foreground (not a shadow) in a case of "a small number of remaining edges and a large number of disappearing edges". Otherwise, in other words, in a case of "a large number of remaining edges and a large number of disappearing edges" or "a small number of remaining edges and a small number of disappearing edges", the area may be determined to be either a shadow or the foreground.

However, given that the "foreground (person)" may be erroneously determined to be a shadow and, for example, the door may be closed, the area is preferably determined to be the "foreground".

In this case, added edges are present both in the contour of the foreground and in the contour of a shadow. Thus, those of the added edges which are located near the contour of a candidate area are not used to determine whether the area is a shadow, and a candidate area containing a sufficiently large number of added edges is determined to be not a shadow (determined to be the foreground).

(Modifications)

Figure 9:
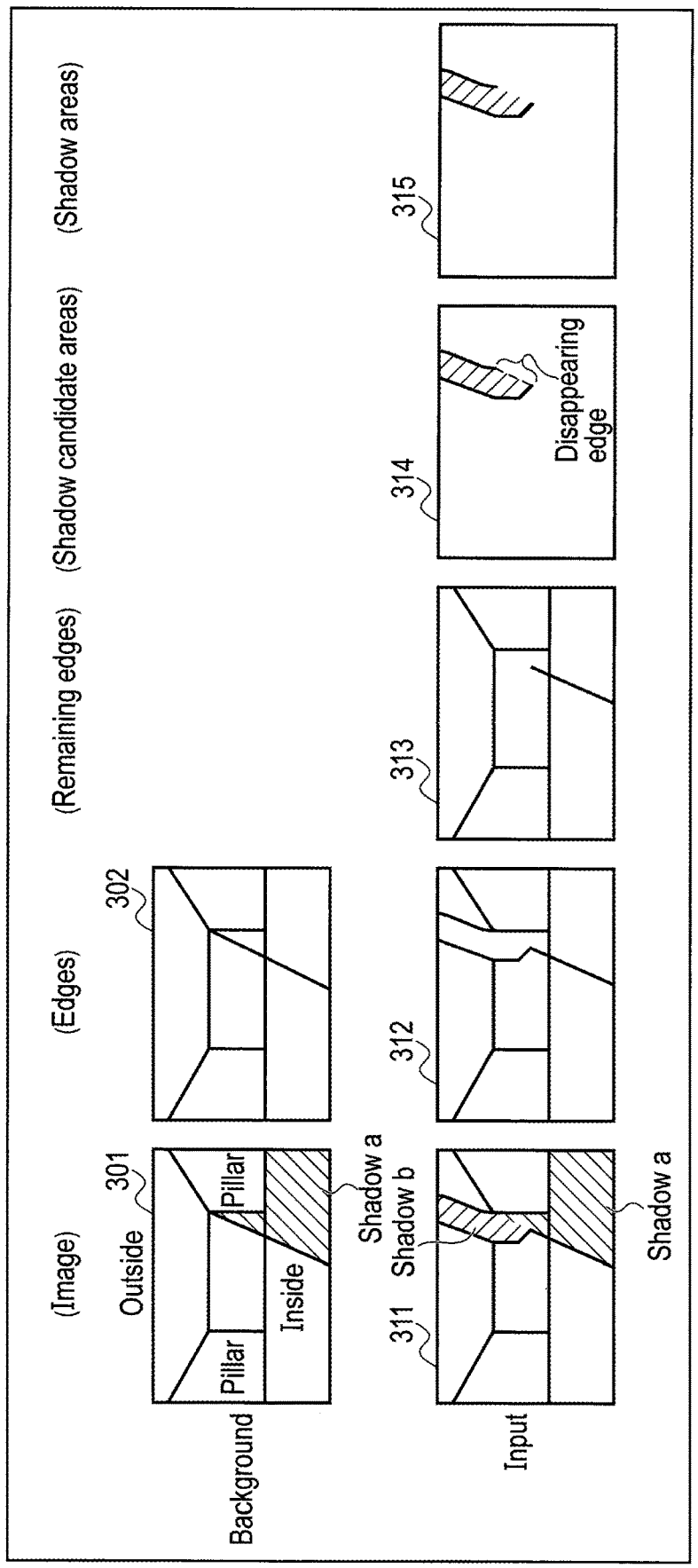
FIG. 9 is a conceptual drawing of a background image and an input image, illustrating a modification of the second embodiment.

FIG. 9 is a conceptual drawing of a background image and an input image, illustrating a modification of the second embodiment. In FIG. 9, an environment is assumed where two shadows overlap. Now, a shadow (a) resulting from outside light is assumed to be present in a background image 301. Edges 302 extracted from the background image 301 include edges corresponding to the shadow (a).

In the input image 311, overlap between a new shadow (b) and the shadow (a) results in edges 312 indicating one shadow into which the shadows (a) and (b) are formed. In this case, the shadow (a) in the background and the shadow (b) in the input appear in the same floor area and thus have substantially the same brightness value. Consequently, no edge (brightness difference) appears at a boundary between the shadows (a) and (b). The edge at the boundary portion between the shadows (a) and (b) disappears, resulting in remaining edges 313 as illustrated. Furthermore, in a shadow candidate area 314 acquired from the input image 311, the boundary portion between the shadows (a) and (b) contains a disappearing edge.

Under the determination conditions in FIG. 8, an area containing a large number of disappearing edges is determined to be the foreground (not a shadow). Thus, if the edge disappears from the contour of the shadow (b) in the input image 311 as in the example in FIG. 9, it is more likely that the shadow (b) is erroneously determined to be the foreground. Thus, for disappearing edges, the "inside of a shadow candidate area except for the contour thereof" is used for the determination, allowing the shadow (b) to be prevented from being erroneously determined to be the foreground (not a shadow).

As described above, according to the second embodiment, also disappearing edges and added edges are taken into consideration in addition to remaining edges. Therefore, shadow areas can be determined using the disappearing edges or the added edges even in such a case where, for example, edges of the background are hidden under the shadow and the shadow areas cannot be determined only by the remaining edges.

Third Embodiment

Now, a third embodiment will be described below.

In the third embodiment, a shadow candidate area is divided into neighborhood areas having similar brightness distributions, and the resultant areas are extracted as a shadow candidate area.

Figure 10:
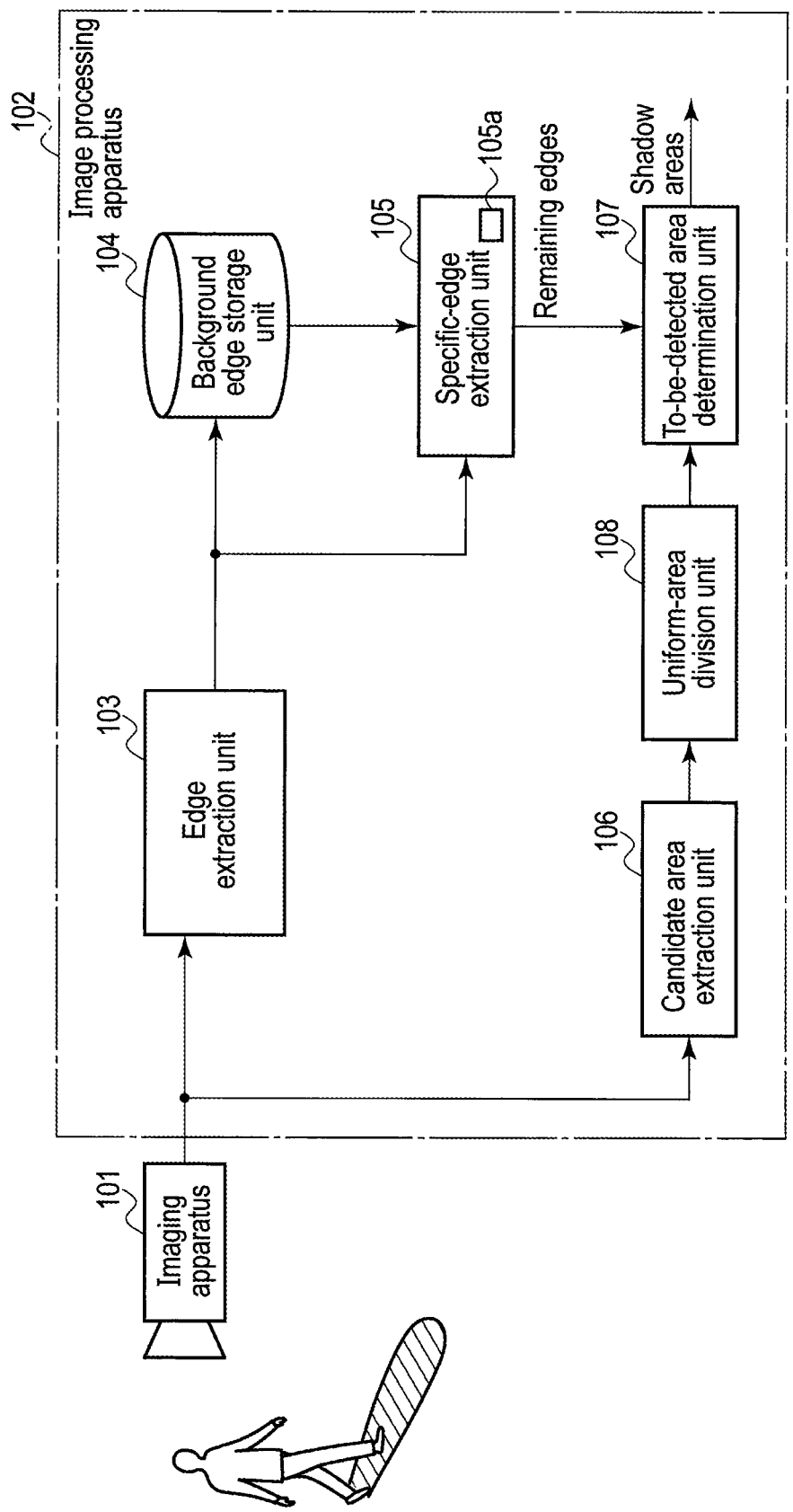
FIG. 10 is a block diagram illustrating a configuration of an image detection system according to a third embodiment.

FIG. 10 is a block diagram illustrating a configuration of an image detection system according to the third embodiment. The same components as those in FIG. 1 in the first embodiment are denoted by the same reference numerals and will not be described below.

In the third embodiment, shadows present in the captured image are to be detected as is the case with the first embodiment. In this case, the image processing apparatus 102 includes a uniform-area division unit 108 in addition to the components of the first embodiment. The uniform-area division unit 108 divides a shadow candidate area extracted by the candidate area extraction unit 106 into neighborhood areas having similar brightness distributions.

Based on the remaining edges extracted by the specific-edge extraction unit 105, the to-be-detected area determination unit 107 determines a shadow area from the candidate areas resulting from the division by the uniform-area division unit 108.

Now, operations of the third embodiment will be described.

FIG. 11 is a flowchart illustrating a shadow area detection process executed by the image processing apparatus 102 according to the third embodiment. Processing in steps S301 to S307 is similar to the processing in steps S101 to S107 in FIG. 2 and will thus not be described below.

In the third embodiment, when the candidate area extraction unit 106 acquires shadow candidate areas, the uniform-area division unit 108 separately extracts, neighborhood areas having similar brightness distributions from the shadow candidate areas, regarded as one shadow candidate area (step S308).

Figure 12:
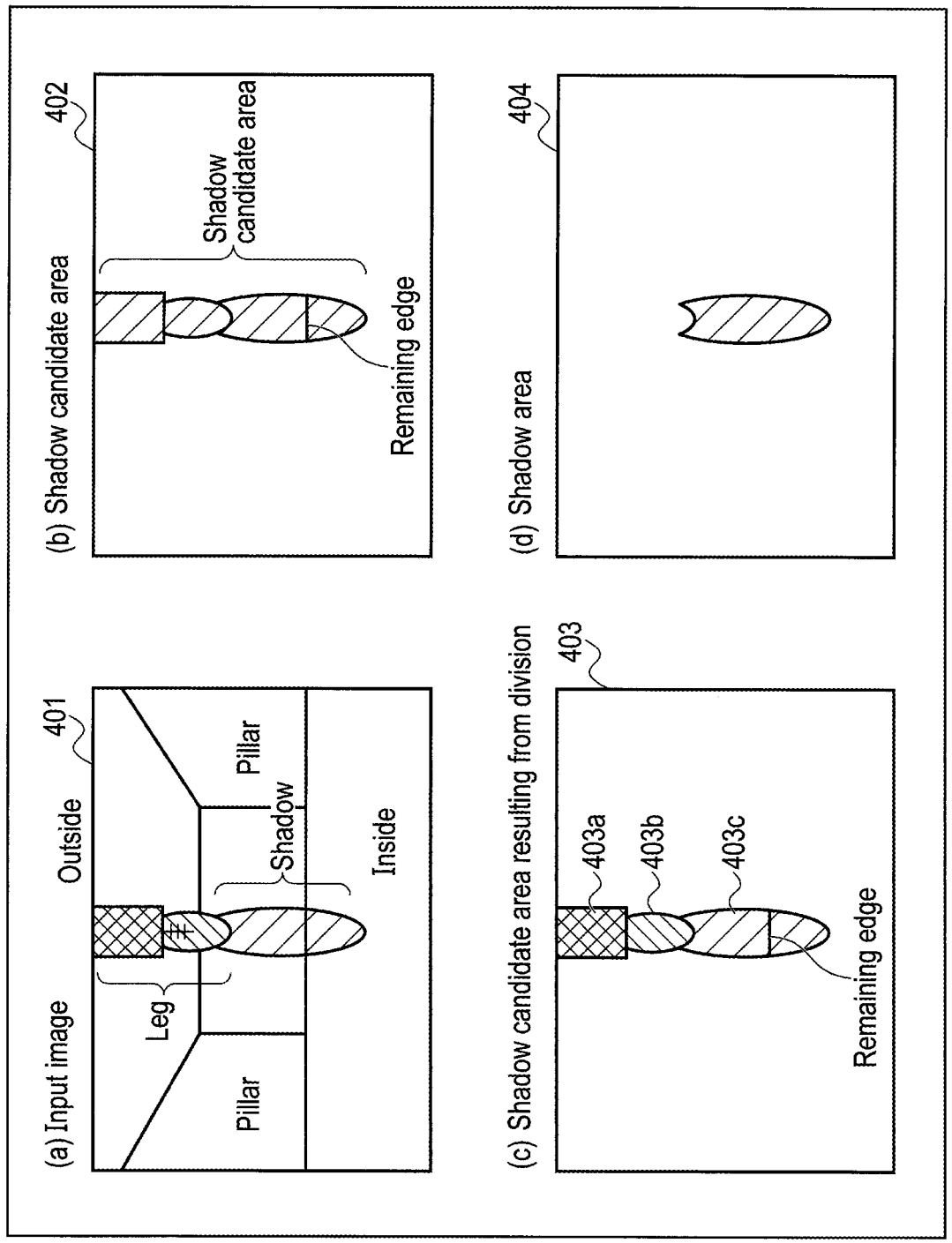
FIG. 12 is a conceptual drawing illustrating division into uniform areas according to the third embodiment.

FIG. 12 illustrates a specific example.

A shadow candidate area 402 as illustrated in section (b) in FIG. 12 is assumed to be extracted from an input image 401 in which a leg of a person and a shadow are connected together as illustrated in section (a) in FIG. 12. In this example, the person's leg (a piece of pants and a shoe) and the shadow are extracted as one shadow area 402.

The shadow candidate area 402 is divided into areas having similar brightness distributions. The resultant shadow candidate area 403 includes three areas 403a, 403b, and 403c as illustrated in section (c) in FIG. 12. The area 403a corresponds to the pant, and the area 403b corresponds to the shoe. The area 403c corresponds to the shadow and includes a remaining edge.

The to-be-detected area determination unit 107 determines a shadow area from the candidate areas acquired by the uniform-area division unit 108 (step S309). In this case, as described in the first embodiment, a candidate containing a sufficient number of remaining edges inside the area is determined to be a shadow area. In the example in section (c) in FIG. 12, each of the areas 403a and 403b contains no remaining edge, whereas the area 403c contains a remaining edge. Therefore, as illustrated in section (d) in FIG. 12, the area 403c is finally extracted as a shadow area 404.

As described above, according to the third embodiment, if an area of a person and an area of a shadow are continuous with each other in the captured image, the shadow area can be correctly detected not by determining a shadow from the continuous area as a whole, but by dividing the continuous area into areas of similar brightness distributions and determining a shadow individually from each of the divided areas.

In the determination process in step S309 described above, the shadow area can be more correctly determined using disappearing edges and added edges instead of using only remaining edges as is the case with the second embodiment.

Fourth Embodiment

Now, a fourth embodiment will be described.

In the description of the first to third embodiments, shadows present in the captured image are detected. In the fourth embodiment, light present in the captured image is detected.

The "light" as used herein refers to, for example, light emitted from lighting equipment and locally streaming into a room (spot light) or light from the sun locally spilling through a gap in the room. Like a shadow of a person or an object, such local light may affect a detection operation utilizing a camera. For example, if there is an area of the room, which is locally exposed to light, it is sometimes very difficult on the captured image to determine whether the area is an exposed lighted portion or a person dressed in white.

A process for determining such an area of a lighted portion will be described below in detail.

An apparatus configuration according to the fourth embodiment is basically the same as the configuration in FIG. 1 in the first embodiment, and is thus not illustrated in the drawings. However, the configuration according to the fourth embodiment corresponds to the configuration in FIG. 1 in which, instead of shadow areas, areas where light is locally present (hereinafter referred to as a lighted portion area) are to be detected. The candidate area extraction unit 106 extracts candidates for a lighted portion area. For extraction of portion candidate areas, for example, areas brighter than a past background may be extracted from difference areas acquired by the well-known background difference method.

The to-be-detected area determination unit 107 determines a lighted portion area from the lighted portion candidate areas extracted by the candidate area extraction unit 106, based on remaining edges extracted by the specific-edge extraction unit 105.

Now, operations of the fourth embodiment will be described.

Figure 14:
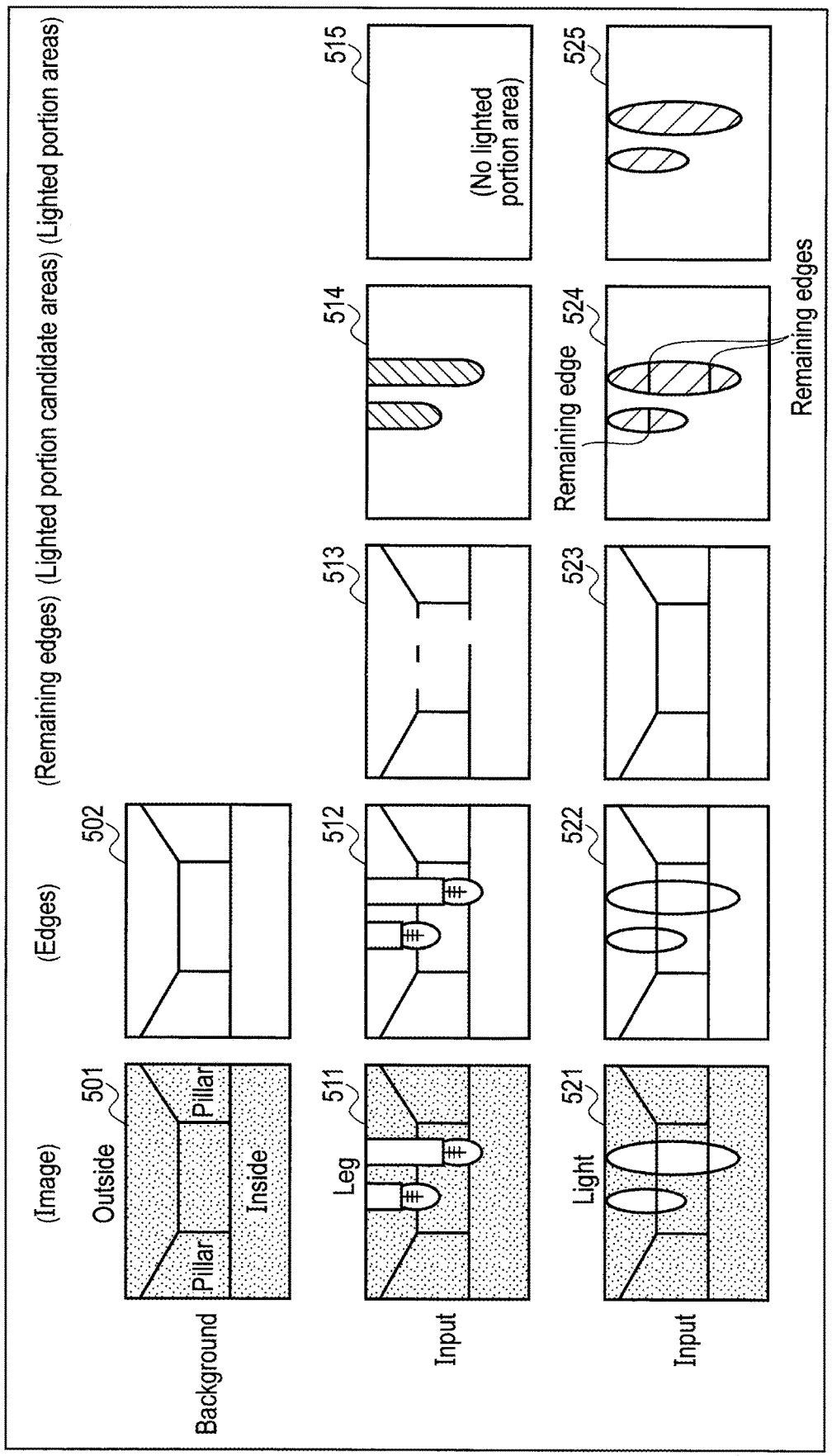
FIG. 14 is a conceptual drawing of a background image and an input image, illustrating the lighted portion area detection process.

FIG. 13 is a flowchart illustrating a lighted portion area detection process executed by the image processing apparatus 102 according to the fourth embodiment. FIG. 14 is a conceptual drawing of a background image and an input image, illustrating the lighted portion area detection process. As is the case with FIG. 3, an environment is assumed where the inside of a room is separated from the outside of the room across a pair of pillars. However, in this case, the inside and outside of the room are assumed to be slightly dark.

Basic processing is similar to the processing illustrated in FIG. 2 for the first embodiment. In the fourth embodiment, the area to be detected is the lighted portion area. As described above, the "lighted portion area" refers to an area where light is locally present, and like shadows, affects the detection operation utilizing a camera.

For initial settings, background edges are preliminarily acquired from an image of an environment where no person or object is present. Specifically, first, the imaging apparatus 101 acquires a background image and loads it into the image processing apparatus 102 (step S401). The edge extraction unit 103 of the image processing apparatus 102 uses, for example, a Sobel edge filter or a Canny edge filter to extract edges each representing a boundary line between areas with different features, from the background image (step S402). The edge extraction unit 103 stores information on the edges in the storage unit 104 (step S403).

A background image 501 illustrated in FIG. 14 contains no person or object, and edges 502 extracted from the background image 501 contain no person or object. Here, only large frames are drawn for convenience, but in actuality, more complicated lines, curves, and the like are extracted as the edges 502.

Then, during detection, the imaging apparatus 101 acquires an input image and loads it into the image processing apparatus 102 (step S404). The input image is a captured image of an environment where a person, an object, or the like is present. The edge extraction unit 103 of the image processing apparatus 102 extracts edges each representing a boundary line between areas with different features, from the input image, as is the case with the above-described background image (step S405).

In actuality, input images each including a number of frames in one second (for example, 30 frames/second) are sequentially loaded into the image processing apparatus 102, which executes a lighted portion area detection process on the input images. In an example in FIG. 14, legs of a person with pants in a bright color (for example, white) and shoes are present in a first input image 511, and edges 512 including the person's legs are extracted from the first input image 511. On the other hand, for example, light from lighting equipment or light from the sun is locally present in a second input image 521, and edges 522 including the lighted portions are extracted from the second input image 521.

When the edges are extracted from the input images, the specific-edge extraction unit 105 compares the edges in the background image stored in the background edge storage unit 104 with the edges in each input image. The specific-edge extraction unit 105 extracts remaining edges present in both images as specific edges needed to determine lighted portion areas (step S406).

In the first input image 511 illustrated in FIG. 14, the background is hidden by the person's legs, resulting in partly discontinued remaining edges 513. Furthermore, typically, a portion of the background present under light does not disappear, and thus, for the second input image 521, resultant remaining edges 523 include the background and the lighted portions.

On the other hand, the candidate area extraction unit 106 extracts lighted portion candidate areas from the input images using a well-known method, for example, the background difference method (step S407). In the example in FIG. 14, the person's legs are extracted from the first input image 511 as lighted portion candidate areas 514, and light-appearing portions are extracted from the second input image 521 as lighted portion candidate areas 524.

The to-be-detected area determination unit 107 determines lighted portion areas from the lighted portion candidate areas extracted by the candidate area extraction unit 106, based on the remaining edges extracted by the specific-edge extraction unit 105 (step S408). In this case, lighted portion candidate areas containing a sufficient number of remaining edges are determined to be lighted portion areas. In the example in FIG. 14, the lighted portion candidate areas 514 acquired from the first input image 511 contain no remaining edge, whereas the lighted portion candidate areas 524 acquired from the second input image 521 contain remaining edges. Therefore, the lighted portion candidate areas 524 acquired from the second input image 521 are extracted as lighted portion areas 552.

With reference to FIG. 15 and FIG. 16, a lighted portion area determination process will be described in detail.

FIG. 15 is a diagram illustrating a relationship between a background/input image and edge areas. As is the case with FIG. 4, for a background image, the areas are classified into areas with edges and areas with no edge on the vertical axis. For an input image, the areas are classified into areas with edges and areas with no edge on the horizontal axis. However, in this case, the area to be detected is not a shadow area but a lighted portion area. FIG. 16 depicts a specific example presented to illustrate various edges. FIG. 16 illustrates that a mixture of legs and light is present in a room corresponding to the background.

In FIG. 15, section (a) indicates edges present both in the background image and in the input image (remaining edges). In the example in FIG. 16, the following correspond to the remaining edges: portions (e11) of the background which are visible under light and portions (e12) of the background which are not hidden by the foreground. The "foreground" as used herein refers to the input image written on the background image.

Section (b) indicates portions of the background image which are present as edges but which are overwritten with the foreground (disappearing edges).

In the example in FIG. 16, a portion (e13) of the background which is hidden by the foreground corresponds to a disappearing edge.

Section (c) indicates areas where no edge is present in the background image but where edges appear in the input image (added edges). In the example in FIG. 16, the following correspond to the added edges: an edge (e14) different from the contour of the foreground, the contour of the foreground (e15), and the contour of the lighted portion (e16).

Section (d) indicates areas containing no edge in the background image or in the input image. In the example in FIG. 16, the following correspond to the areas with no edge: the inside of the foreground (e17), the inside of the background (e18), and the inside of the lighted portion (e19).

Then, areas brighter than the room, which corresponds to the background, are extracted as light candidate areas. Those of the light candidate areas which do not contain a sufficient number of remaining edges may be determined to be not lighted portions. Those of the light candidate areas which contain a sufficient number of remaining edges may be determined to be lighted portions.

The sufficiency of remaining edges is determined as is the case with the first embodiment. For example, an area may be determined to contain a sufficiently large number of remaining edges if the number of pixels E in the remaining edges is "E≥TH". Otherwise the area may be determined to contain a sufficiently small number of remaining edges. The threshold TH may be varied depending on whether a shadow or light is to be detected.

Consequently, according to the fourth embodiment, even if areas of the image which contain light are an area to be detected, lighted portion areas included in the image can be detected by extracting remaining edges present both in the background and in the input image as is the case with the first embodiment. Therefore, for example, in any system utilizing a captured image to detect a person, even if, for example, light from lighting equipment or light from the sun is present within a detection range, the person can be exclusively correctly detected with the light excluded.

Additionally, the fourth embodiment may be combined with the first embodiment to provide a configuration which detects both a shadow and light.

Fifth Embodiment

Now, a fifth embodiment will be described.

In the fourth embodiment, lighted portion areas are determined by focusing on remaining edges present both in the background image and in the input image. In the fifth embodiment, the lighted portion areas are determined by taking into account disappearing edges and added edges in addition to the remaining edges.

An apparatus configuration according to the fifth embodiment is basically the same as the configuration in FIG. 6 in the second embodiment, and is thus not illustrated in the drawings. However, the configuration according to the fifth embodiment corresponds to the configuration in FIG. 6 in which, instead of shadow areas, lighted portion areas are to be detected. The candidate area extraction unit 106 extracts candidates for a lighted portion area. The specific-edge extraction unit 105 is provided with the disappearing-edge extraction unit 105*b* and the added-edge extraction unit 105*c* in addition to the remaining-edge extraction unit 105*a*. The disappearing-edge extraction unit 105*b* extracts disappearing edges which are present in the background image but which are not in the input image. The added-edge extraction unit 105*c* extracts disappearing edges which are absent in the background image but which are present in the input image. The specific-edge extraction unit 105 compares edges extracted from the background image with edges extracted from the input image to extract the above-described three types of edges (remaining edges, disappearing edges, and added edges) as specific edges needed to determine lighted portion areas.

The to-be-detected area determination unit 107 determines lighted portion areas from the candidate areas extracted by the candidate area extraction unit 106, based on the above-described three types of edges extracted by the specific-edge extraction unit 105.

Now, operations of the fifth embodiment will be described.

FIG. 17 is a flowchart illustrating a lighted portion area detection process executed by the image processing apparatus 102 according to the fifth embodiment. Processing in steps S501 to S505 is similar to the processing in steps S401 to S405 in FIG. 13 and will thus not be described below.

When edges are extracted from the input image, the specific-edge extraction unit 105 compares the edges in the background image stored in the background edge storage unit 104 with the edges in the input image to extract remaining edges, disappearing edges, and added edges from the input image as specific edges needed to determine lighted portion areas (step S506).

The remaining edges are edges present both in the background image and in the input image (see section (a) in FIG. 15 and e11 and e12 in FIG. 16). The disappearing edges are edges which are present in the background image but which are overwritten with the foreground in the input image and disappear (see section (b) in FIG. 15 and e13 in FIG. 16). The added edges are edges which are absent in the background image but which appear in the input image (see section (c) in FIG. 15 and e14, e15, and e16 in FIG. 16).

On the other hand, the candidate area extraction unit 106 extracts candidates for a lighted portion area (lighted portion candidate areas) from the input image using a well-known method, for example, the background difference method (step S507). The to-be-detected area determination unit 107 determines lighted portion areas from the lighted portion candidate areas extracted by the candidate area extraction unit 106 based on the above-described three types of edges extracted by the specific-edge extraction unit 105 (step S508). In this case, the determination method varies according to the type of the edge.

Figure 18:
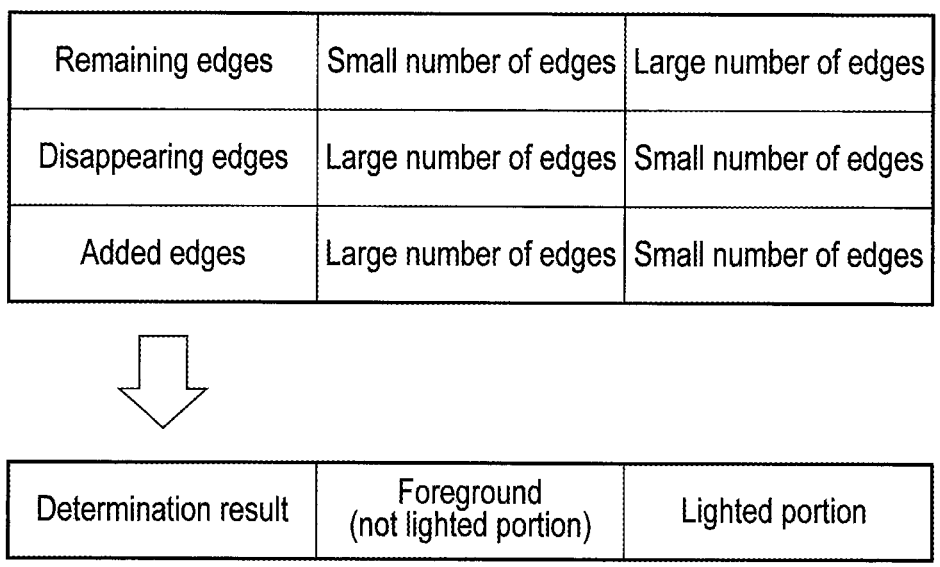
FIG. 18 is a diagram illustrating determination conditions for various edges according to the fifth embodiment.

That is, as illustrated in FIG. 18, for remaining edges, those of the lighted portion candidate areas which contain a sufficient number of remaining edges are determined to be lighted portion areas. For disappearing edges, those of the lighted portion candidate areas which do not contain a sufficient number of disappearing edges are determined to be lighted portion areas. For added edges, those of the lighted portion candidate areas which do not contain a sufficient number of added edges are determined to be lighted portion areas. In contrast, the following areas correspond to the foreground: those of the lighted portion candidate areas which do not contain a sufficient number of remaining edges, those of the lighted portion candidate areas which contain a sufficient number of disappearing edges, and those of the lighted portion candidate areas which contain a sufficient number of added edges. These areas are thus determined to be not lighted portion areas.

As is the case with the second embodiment, the sufficiency of the edge is determined using, for example, the thresholds TH1, TH2, and TH3 preset for the respective types of edges. The thresholds TH1, TH2, and TH3 may be varied depending on whether a shadow or light is to be detected.

In this case, not all of the above-described three types of edges are extracted depending on the image capturing environment or the like. Thus, at least one of the three types of edges may be used to determine lighted portion areas. In this case, one or two types of edges the number of which is significantly large or small than the number of the other type(s) of edges may exclusively be used.

In combinations in FIG. 18, an area is determined to be a lighted portion in a case of "a large number of remaining edges and a small number of disappearing edges" and to be the foreground (not a lighted portion) in a case of "a small number of remaining edges and a large number of disappearing edges". Otherwise, in other words, in a case of "a large number of remaining edges and a large number of disappearing edges" or "a small number of remaining edges and a small number of disappearing edges", the area may be determined to be either a lighted portion or the foreground. However, given that the "foreground (person)" may be erroneously determined to be a lighted portion and, for example, the door may be closed, the area is preferably determined to be the "foreground".

In this case, an added edge is present both in the contour of the foreground and in the contour of a lighted portion. Thus, those of the added edges which are located near the contour of a candidate area are not used to determine whether the area is a lighted portion, and a candidate area containing a sufficiently large number of added edges is determined to be not a lighted portion (determined to be the foreground).

(Modifications)

Figure 19:
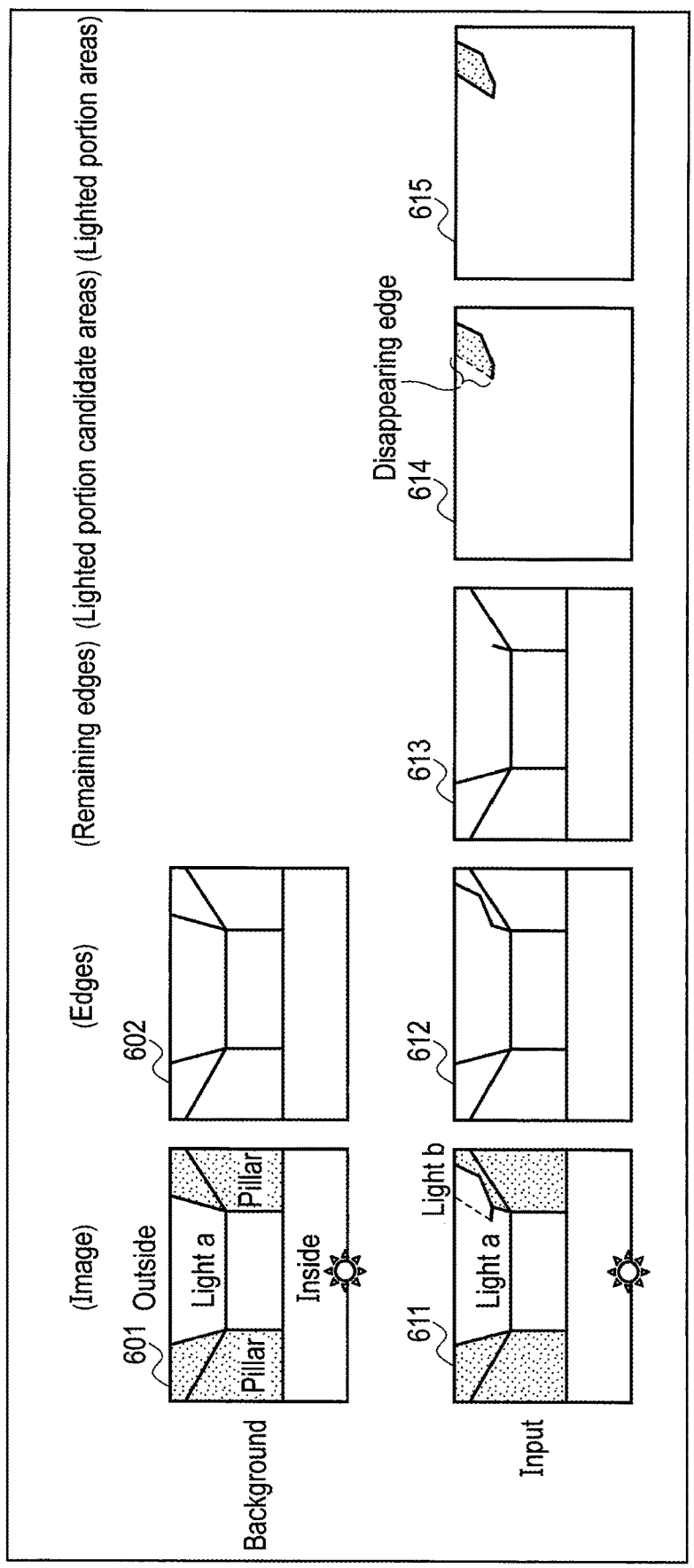
FIG. 19 is a conceptual drawing of a background image and an input image, illustrating a modification of the fifth embodiment.

FIG. 19 is a conceptual drawing of a background image and an input image, illustrating a modification of the fifth embodiment. In FIG. 19, an environment is assumed where two beams of light overlap. In a background image 601, a light beam (a) portion is assumed to be preliminarily present in the room; the light beam (a) is emitted from, for example, lighting equipment installed in the room. Edges 602 extracted from the background image 601 include an edge corresponding to the light beam (a).

In the input image 611, when a new light beam (b) emitted from, for example, external lighting equipment or headlights of a car overlaps the light beam (a), resultant edges 612 represent one lighted portion corresponding to a combination of the light beam (a) and the light beam (b). In this case, the light beam (a) in the background and the light beam (b) in the input appear in the same floor area and thus have substantially the same brightness value. Consequently, no edge (brightness difference) appears at the boundary between the light beams (a) and (b). The edge at the boundary portion between the light beams (a) and (b) disappears, resulting in remaining edges 613 as illustrated. Furthermore, in a lighted portion candidate area 614 acquired from the input image 611, the boundary portion between the light beams (a) and (b) contains a disappearing edge.

Under the determination conditions in FIG. 18, an area containing a large number of disappearing edges is determined to be the foreground (to be not a lighted portion). Thus, if the edge disappears from the contour of the light beam (b) in the input image 611 as in the example in FIG. 19, it is more likely that the light beam (b) is erroneously determined to be the foreground. Thus, for disappearing edges, the "inside of a lighted portion candidate area except for the contour thereof" is used for the determination, allowing the light beam (b) to be prevented from being erroneously determined to be the foreground (to be not a lighted portion).

As described above, according to the fifth embodiment, disappearing edges and added edges are taken into consideration in addition to remaining edges. Therefore, lighted portion areas can be determined using the disappearing edges or the added edges even if, for example, edges of the background are hidden under light and lighted portion areas cannot be determined only by the remaining edges.

Additionally, the fifth embodiment may be combined with the second embodiment to provide a configuration which detects both a shadow and light.

Sixth Embodiment

Now, a sixth embodiment will be described.

In the sixth embodiment, a lighted portion candidate area is divided into neighborhood areas having similar brightness distributions, and the resultant areas are extracted as a lighted portion candidate area.

An apparatus configuration according to the sixth embodiment is basically the same as the configuration in FIG. 10 in the third embodiment, and is thus not illustrated in the drawings. However, the configuration according to the sixth embodiment corresponds to the configuration in FIG. 10 in which, instead of shadow areas, lighted portion areas are to be detected. The candidate area extraction unit 106 extracts a candidate for a lighted portion area. The uniform-area division unit 108 divides the lighted portion candidate area extracted by the candidate area extraction unit 106 into neighborhood areas having similar brightness distributions.

Based on the remaining edges extracted by the specific-edge extraction unit 105, the to-be-detected area determination unit 107 determines a lighted portion area from the candidate areas resulting from the division by the uniform-area division unit 108.

Now, operations of the sixth embodiment will be described.

FIG. 20 is a flowchart illustrating a lighted portion area detection process executed by the image processing apparatus 102 according to the sixth embodiment. Processing in steps S601 to S607 is similar to the processing in steps S401 to S407 in FIG. 13 and will thus not be described below.

In the sixth embodiment, when the candidate area extraction unit 106 acquires lighted portion candidate areas, the uniform-area division unit 108 separately extracts, neighborhood areas having similar brightness distributions from the lighted portion candidate areas, regarded as one lighted portion candidate area (step S608).

Figure 21:
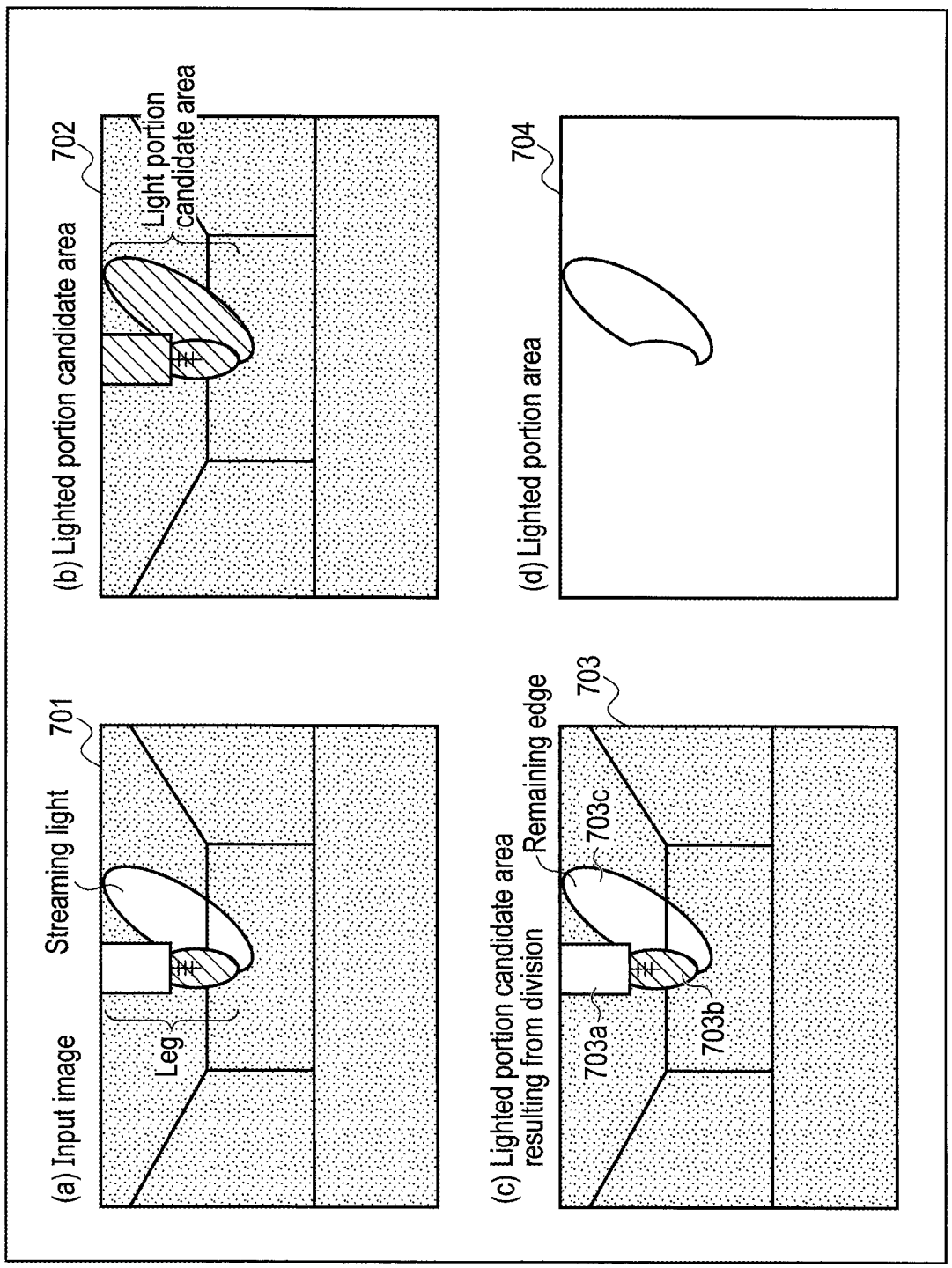
FIG. 21 is a conceptual drawing illustrating division into uniform areas according to the sixth embodiment.

FIG. 21 illustrates a specific example.

A lighted portion candidate area 702 as illustrated in section (b) in FIG. 21 is assumed to be extracted from an input image 701 in which a leg of a person and streaming light are connected together as illustrated in section (a) in FIG. 21. In this example, a leg of a person (a piece of pants and a shoe) is assumed to be in a bright color (for example, white), with light from, for example, external lighting equipment streaming onto the leg. In such a case, the person's leg and the streaming lighted portion are extracted as one lighted portion candidate area 702.

The lighted portion candidate area 702 is divided into areas having similar brightness distributions. Then, a resultant lighted portion candidate area 703 includes three areas 703a, 703b, and 703c as illustrated in section (c) in FIG. 21. The area 703a corresponds to the pant, and the area 703b corresponds to the shoe. The area 703c corresponds to the lighted portion and includes a remaining edge.

The to-be-detected area determination unit 107 determines a lighted portion area from the candidate areas acquired by the uniform-area division unit 108 (step S609). In this case, as described in the fourth embodiment, a candidate containing a sufficient number of remaining edges inside the area is determined to be a lighted portion area.

In the example in section (c) in FIG. 21, the areas 703a and 703b contain no remaining edge, and the area 703c contains a remaining edge. Therefore, as illustrated in section (d) in FIG. 21, the area 703c is finally extracted as a lighted portion area 704.

Consequently, according to the sixth embodiment, if an area of a person and an area of a lighted portion are continuous with each other in the captured image, the area of the lighted portion can be correctly detected not by determining a lighted portion from the continuous area as a whole, but by dividing the continuous area into areas of similar brightness distributions and then determining a lighted portion from the each of the divided areas.

In the determination process in step S609 described above, the lighted portion area can be more correctly determined using disappearing edges and added edges instead of using only remaining edges as is the case with the fifth embodiment.

Furthermore, the sixth embodiment may be combined with the third embodiment to provide a configuration which detects both a shadow and light.

Application Examples

Now, the application, to an elevator, of the image detection system according to the present invention will be described.

FIG. 22 is a diagram illustrating a configuration of a ride detection system for an elevator. Here, the description takes a single car as an example. However, a similar configuration is applicable to a plurality of cars.

A camera 12 corresponding to the image apparatus 101 of the present system is installed at a top portion of a doorway of a car 11. Specifically, the camera 12 is installed in a modesty panel 11a covering the top portion of the doorway of the car 11 such that a lens portion of the camera 12 faces toward a hall 15.

The camera 12 is a small monitoring camera, for example, an in-vehicle camera. The camera 12 includes a wide lens and is capable of consecutively capturing a number of frames in one second (for example, 30 frames/second). When the car 11 arrives at each floor and the door is opened, the camera 12 captures an image representing the state of the hall 15 including the state of the vicinity of a car door 13 in the car 11.

The image capturing range in this case is adjusted to L1+L2 (L1>>L2). L1 denotes the image capturing range on the hall side and corresponds to a length of, for example, 3 m from the car door 13 toward the hall. L2 denotes the image capturing range on the car side and corresponds to a length of, for example, 50 cm from the car door 13 toward a car back surface. L1 and L2 indicate ranges in a depth direction, and a range in a width direction (orthogonal to the depth direction) is assumed to be at least larger than the breadth of the car 11.

At the hall 15 on each floor, a hall door 14 is installed at an arrival gateway of the car 11 in such a manner as to be freely opened and closed. When the car 11 arrives at the hall 15, the hall door 14 engages with the car door 13 and is operatively opened and closed. A power source (door motor) is provided on the car 11 side, and the hall door 14 is opened and closed simply in conjunction with the car door 13. The hall door 14 is hereinafter assumed to be open when the car door 13 is open and to be closed when the car door 13 is closed.

Each image (video) captured by the camera 12 is analyzed in real time by an image processing apparatus 20 corresponding to the image processing apparatus 102 of the present system. FIG. 22 illustrates the image processing apparatus 20 taken out of the image processing apparatus 20 for convenience. However, in actuality, the image processing apparatus 20 is housed in the modesty plate 11a along with the camera 12.

The image processing apparatus 20 includes a storage unit 21 and a user detection unit 22. The storage unit 21 includes a buffer area where images captured by the camera are sequentially saved and where data needed for processing by the user detection unit 22 is temporarily held.

The user detection unit 22 focuses on motion of a person or an object located closest to the car door 13 in a plurality of images which are captured by the camera 12 and which are arranged in sequential and chronological order. In terms of functions, the user detection unit 22 includes a motion detection unit 22a, a position estimation unit 22b, and a ride intention estimation unit 22c.

The motion detection unit 22a compares brightness among images in units of blocks to detect motion of a person or an object. The "motion of a person or an object" as used herein refers to motion of a movable body such as a person or a wheelchair at the hall 15.

The position estimation unit 22b extracts a block which is included in blocks with motion detected in each image by the motion detection unit 22a and which is located closest to the car door 13. The position estimation unit 22b then estimates the coordinate position (Y coordinate illustrated in FIG. 5) of the block in a direction from the center of the car door 13 (the center of a door frontage) toward the hall to be the position of the user (foot position). The ride intention estimation unit 22c determines whether the user intends to ride the elevator based on chronological changes in position estimated by the position estimation unit 22b.

These functions (motion detection unit 22a, the position estimation unit 22b, and the ride intention estimation unit 22c) may be provided in the camera 12 or in a car control apparatus 30.

The car control apparatus 30 is connected to an elevator control apparatus not illustrated in the drawings to transmit and receive various signals such as hall call signal and a car call signal to and from the elevator control apparatus.

The "hall call" refers to a call signal registered by operating one of hall call buttons installed at the hall 15 on each floor but not illustrated in the drawings, and contains information on a registration floor and a destination direction. The "car call" refers to a call signal registered by operating one of destination call buttons installed in the car 11 but not illustrated in the drawings, and contains information on a destination floor.

The car control apparatus 30 includes a door open/close control unit 31. The door open/close control unit 31 controls opening and closing of the car door 13 when the car 22 arrives at the hall 15. Specifically, the door open/close control unit 31 opens the car door 13 when the car 11 arrives at the hall 15, and a prescribed time later, closes the car door 13. However, if the user detection unit 22 of the image processing apparatus 20 detects a person with an intention to ride the elevator while the car door 13 is being closed, the door open/close control unit 31 inhibits the door closing operation of the car door 13 to keep the door open.

Figure 23:
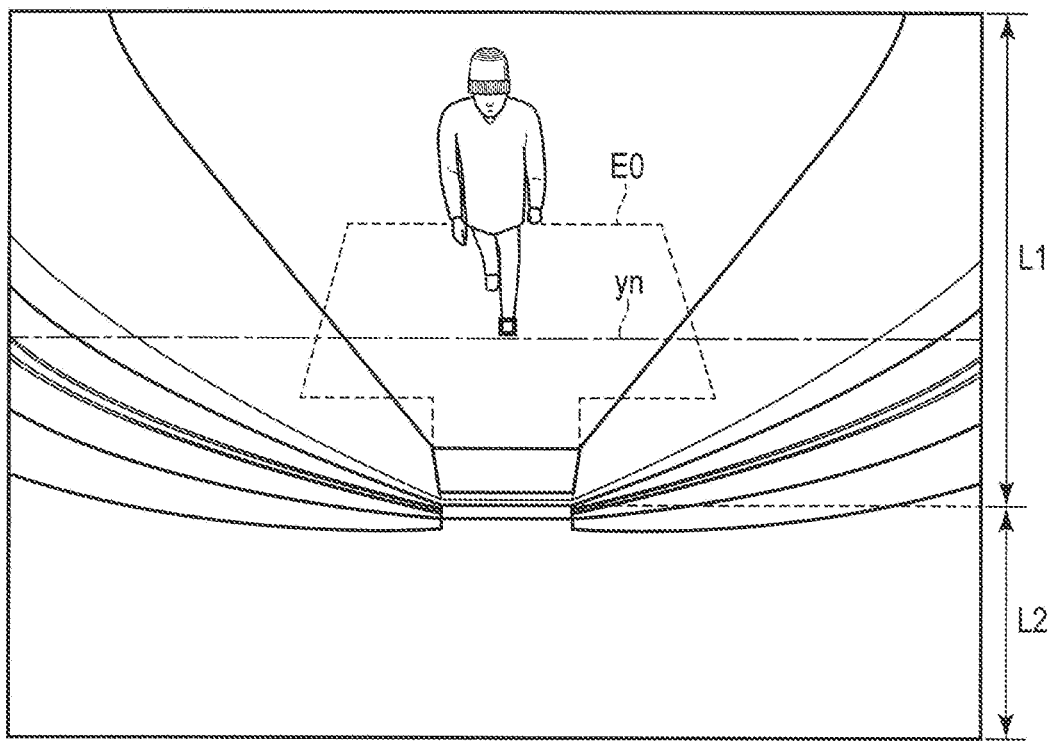
FIG. 23 is a diagram illustrating an example of an image captured by a camera of the ride detection system.

FIG. 23 is a diagram illustrating an example of an image captured by the camera 12. In FIG. 23, a position estimation area is denoted by E0, and the Y coordinate at which the foot position of the user is detected is denoted by yn.

The camera 12 is installed at the upper part of the doorway of the car 11. Therefore, when the car 11 opens the car door at the hall 15, the camera 12 captures an image of the prescribed range (L1) on the hall side and the prescribed range (L2) inside the car. In this case, the use of the camera 12 serves to increase a detection range to allow detection of even a user somewhat distant from the car 11.

On the other hand, a person having merely passed by the hall 15 (the person not to ride the car 11) may be erroneously detected, and the car door 13 may be opened. Thus, an image captured by the camera 12 is divided into blocks each with a given size, and blocks with motion of a person or an object are detected and followed to allow determination of whether or not the user intends to ride the elevator.

In such a configuration, the image processing apparatus 20 is provided with the functions of the image processing apparatus 102 of the present system to determine shadow areas or lighted portion areas in an image captured by the camera 12, using the method described in each of the embodiments. Then, users intending to ride the elevator can be exclusively accurately detected and reflected in open/close control of the door.

The image detection system according to the present invention is not limited to the above-described open/close control of the elevator door but is also applicable to open/close control of, for example, automatic doors in a building in a manner similar to that described above. Furthermore, the image detection system according to the present invention is not limited to the door open/close control but is applicable to systems in general which detect shadows or lighted portions to perform certain control.

The at least one embodiment described above provides an image detection system capable of correctly detecting a shadow or light in a captured image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image detection system comprising:
an imaging apparatus that acquires an input image, the imaging apparatus being installed at an optional position; and
an imaging processing apparatus that
extracts first edges each representing a boundary line between areas with different features, from the input image;
compares second edges preliminarily extracted from a background image with the first edges to extract specific edges including at least remaining edges present in the input image and the background image;
extracts candidate areas to be detected from the input image; and
determines a candidate area in which an amount of the at least remaining edges is larger than a preset threshold value inside the candidate area except for a contour of the candidate area, as an area to be detected, based on the specific edges.

2. The image detection system of claim 1, wherein the imaging processing apparatus
extracts disappearing edges present in the background image but absent in the input image and added edges absent in the background image but present in the input image in addition to the remaining edges, and
determines the area to be detected from the candidate areas based on at least one combination of the remaining edges, the disappearing edges, and the added edges.

3. The image detection system of claim 2, wherein the imaging processing apparatus determines an area which contains more remaining edge than a preset first threshold, an area which contains less disappearing edges than a preset second threshold, or an area which contains less added edges a preset third threshold, as the area to be detected.

4. The image detection system of claim 3, wherein the imaging processing apparatus determines the candidate area as the area to be detected in a case where inside of the candidate area excluding a contour thereof contains more remaining edges than the first threshold, in a case where the inside of the candidate area excluding the contour thereof contains less disappearing edges than the second threshold, or in a case where the inside of the candidate area excluding the contour thereof contains less added edges than the third threshold.

5. The image detection system of claim 1, wherein the imaging processing apparatus further
divides the candidate area into uniform areas having similar brightness distributions, and
determines the area to be detected for each of the areas resulting from the dividing.

6. The image detection system of claim 1, wherein the area to be detected includes an area where a shadow of a person or an object is present.

7. The image detection system of claim 1, wherein the area to be detected includes an area where light is locally present.

* * * * *